(12) United States Patent
Moresmau et al.

(10) Patent No.: US 12,499,120 B2
(45) Date of Patent: *Dec. 16, 2025

(54) METHODS AND SYSTEMS FOR TRACKING DATA LINEAGE FROM SOURCE TO TARGET

(71) Applicant: Rocket Software Technologies, Inc., Waltham, MA (US)

(72) Inventors: Jean-Philippe Moresmau, Saint Guilhem le Desert (FR); Fabian Schyns, Sherbrooke (CA); Uta Sommerweiss, Mittweida (DE); Lothar Grabowsky, Freiberg (DE); Jens-Uwe Richter, Burkhardtsdorf (DE); Henric Gomes, Naples, FL (US); Gerald Csapo, Pressbaum (AT); Karsten Baensch, Gleina (DE); Gunter Wiedemer, Malsch (DE); Micha Treiber, Leopoldshafen (DE)

(73) Assignee: Rocket Software Technologies, Inc., Waltham, MA (US)

( * ) Notice: Subject to any disclaimer, the term of this patent is extended or adjusted under 35 U.S.C. 154(b) by 171 days.

This patent is subject to a terminal disclaimer.

(21) Appl. No.: 18/474,701

(22) Filed: Sep. 26, 2023

(65) Prior Publication Data

US 2024/0078244 A1    Mar. 7, 2024

Related U.S. Application Data

(63) Continuation-in-part of application No. 17/386,347, filed on Jul. 27, 2021, now Pat. No. 11,847,040, which is a continuation-in-part of application No. 15/457,808, filed on Mar. 13, 2017, now Pat. No. 11,086,751.

(60) Provisional application No. 62/309,297, filed on Mar. 16, 2016.

(51) Int. Cl.
*G06F 16/25* (2019.01)

(52) U.S. Cl.
CPC ................. *G06F 16/254* (2019.01)

(58) Field of Classification Search
CPC ..................................... G06F 16/254
See application file for complete search history.

(56) References Cited

U.S. PATENT DOCUMENTS

| 6,069,957 | A | 5/2000 | Richards | |
|---|---|---|---|---|
| 6,708,166 | B1 * | 3/2004 | Dysart | G06F 16/289 |
| | | | | 707/999.005 |
| 9,158,827 | B1 * | 10/2015 | Vu | G06F 16/254 |

(Continued)

FOREIGN PATENT DOCUMENTS

AU    2014233672 A1 *  9/2015  ........... G06F 16/219

*Primary Examiner* — Pierre Vital
*Assistant Examiner* — Jedidiah P Ferrer
(74) *Attorney, Agent, or Firm* — Danielson Legal LLC

(57) ABSTRACT

Disclosed herein are systems and methods for intelligent metadata management and data lineage tracing. In exemplary embodiments of the present disclosure, a data element can be traced throughout multiple applications, platforms, and technologies present in an enterprise to determine how and where the specific data element is utilized. The data element is traced via a hierarchical key that defines it using metadata. In this way, metadata is interpreted and used to trace data lineage from one end of an enterprise to another.

20 Claims, 22 Drawing Sheets

(56) References Cited

U.S. PATENT DOCUMENTS

| | | |
|---|---|---|
| 9,213,707 B2 | 12/2015 | Conner |
| 9,483,537 B1 | 11/2016 | Peters et al. |
| 9,619,535 B1 * | 4/2017 | Kapoor ................ G06F 16/254 |
| 11,086,751 B2 | 8/2021 | Moresmau et al. |
| 11,847,040 B2 | 12/2023 | Moresmau et al. |
| 2004/0153994 A1 | 8/2004 | Bates et al. |
| 2006/0111888 A1 | 5/2006 | Hiew et al. |
| 2006/0271528 A1 | 11/2006 | Gorelik |
| 2007/0016624 A1 | 1/2007 | Powers et al. |
| 2007/0156764 A1 | 7/2007 | O'Connell et al. |
| 2009/0083306 A1 | 3/2009 | Sichi et al. |
| 2010/0114628 A1 | 5/2010 | Adler et al. |
| 2012/0310875 A1 | 12/2012 | Prahlad et al. |
| 2013/0151557 A1 | 6/2013 | Shanken et al. |
| 2013/0332423 A1 | 12/2013 | Puri et al. |
| 2014/0032875 A1 | 1/2014 | Butler |
| 2014/0114907 A1 | 4/2014 | Kozina et al. |
| 2014/0258891 A1 | 9/2014 | Gao et al. |
| 2016/0028580 A1 | 1/2016 | Radivojevic |
| 2016/0140204 A1 | 5/2016 | Brown et al. |
| 2016/0253340 A1 | 9/2016 | Barth et al. |
| 2017/0060725 A1 | 3/2017 | Klausner et al. |
| 2021/0357503 A1 | 11/2021 | Moresmau et al. |

\* cited by examiner

```
018700      EXEC SQL
018800      INSERT INTO DLNCUST
018900          (CUST_ID,
019000           CUST_NAME,
019100           CUST_AREACODE)
020100      VALUES (:DLNCUST.CUST-ID,
020200              :DLNCUST.CUST-NAME,
020300              :DLNCUST.CUST-AREACODE)
```

METHODS AND SYSTEMS FOR TRACKING DATA LINEAGE FROM SOURCE TO TARGET

CROSS-REFERENCE TO RELATED APPLICATIONS

The present application is a continuation-in-part of U.S. patent application Ser. No. 17/386,347, filed Jul. 27, 2021, entitled "Systems and Methods for Detecting Data Alteration from Source to Target," which is a continuation-in-part of U.S. patent application Ser. No. 15/457,808, filed Mar. 13, 2017, entitled "Intelligent Metadata Management and Data Lineage Tracing," now U.S. Pat. No. 11,086,751, issued Aug. 10, 2021, which claims the priority benefit of U.S. Provisional Patent Application No. 62/309,297 filed on Mar. 16, 2016, entitled "Systems and Methods for Intelligent Metadata Management and Data Lineage". The aforementioned disclosures are hereby incorporated by reference herein in their entireties including all references cited therein for all purposes.

TECHNICAL FIELD

The present technology relates generally to data governance, and, more particularly to, intelligent enterprise metadata management and data lineage tracing.

BACKGROUND OF THE DISCLOSURE

A typical organization such as a business enterprise collects a large amount of data, and the business and Information Technology (IT) professionals using the data have a growing need to clearly understand the data, its lineage, structure, and policies. Furthermore, these professionals demand accessibility, accountability, and transparency because their success depends on decisions based on this data. For example, business professionals may need to understand for compliancy reasons where information is originally sourced from and what happened to the information to produce a figure on a report. Therefore, there is a need to manage information about the data, known as metadata, to understand complex relationships between objects from a variety of perspectives. Also, as an enterprise continuously goes through change, business and IT professionals have a need to quickly understand the source of data and the impact of change across different systems, different platforms, different programming languages, and different data stores. Embodiments of the present disclosure provide users metadata management about every aspect of an enterprise and data lineage tracing.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

In exemplary methods of the present disclosure, data lineage of a selected data element is determined across an enterprise. The data lineage is determined for a selected data element that is traced throughout a plurality of computing systems across an enterprise via metadata defined by a hierarchical key that is stored in a repository. In the exemplary methods, a selection of a data element for tracing across an enterprise, the data element defined by a hierarchical key stored in a repository, is received, a previously generated representation of source code is parsed to locate computing resources used in the computation of the selected data element, the selected data element is linked to computing resources utilizing the selected data element in a source-target pair, and each source target pair is combined to produce an end-to-end data flow for the selected data element throughout the enterprise. The data flow, also referred to herein as a data lineage, is displayed on a graphical user interface accessible to a user.

In some aspects, the techniques described herein relate to a computer-implemented method for determining data lineage of a selected data element across an enterprise software system, the method including: receiving, at a processor, a selection of a data element for tracing across a plurality of disparate software platforms from one end of the enterprise software system to another end of the enterprise software system, the data element defined by a subsequently defined hierarchical key, and the data element stored in a repository; intelligently parsing, by the processor, a representation of source code to locate and understand computing instructions where the selected data element has been utilized; processing, by the processor, the computing instructions to determine how the selected data element is computed; determining, by the processor, at least one computing resource used in the computation of the selected data element; parsing, by the processor, the representation of source code to locate and understand computing instructions where each of the at least one computing resources used in the computation of the selected data element has been utilized; intelligently linking, by the processor, the selected data element to each of the at least one computing resources used in the computation of the selected data element as at least one source-target pair; combining, by the processor, each of the at least one source-target pair to compute a data lineage for the selected data element; displaying, by the processor, the data lineage on a graphical user interface accessible to a user, the data lineage including a graphical data flow for the selected data element from each source-target pair across the plurality of disparate software platforms in the enterprise software system; tracking, by the processor, the data lineage over a time period; determining, by the processor, an alteration of the data lineage for the selected data element, the alteration of the data lineage being a change in the at least one source-target pair across the plurality of disparate software platforms in the enterprise software system over the time period; and providing, by the processor, an alert of the alteration of the data lineage for the selected data element, the alert being an indication of the change in the at least one source-target pair across the plurality of disparate software platforms in the enterprise software system over the time period.

In some aspects, the techniques described herein relate to a method, wherein the tracking the data lineage over the time period includes: receiving a first date and time input for the tracking of the data lineage over the time period; receiving a second date and time input for the tracking of the data lineage over the time period; and comparing the data lineage at the first date and time input with the data lineage at the second date and time input.

In some aspects, the techniques described herein relate to a method, further including: displaying the alteration of the data lineage for the selected data element on the graphical user interface accessible to the user, the alteration of the data lineage being the change in the at least one source-target pair over the time period including a change in the graphical data flow for the selected data element from each source-target pair across the plurality of disparate software platforms in the enterprise software system during the time period.

In some aspects, the techniques described herein relate to a method, further including: storing, using a database, the data lineage over the time period; and analyzing, by the processor, the data lineage over the time period, the analyzing the data lineage over the time period including a source location of each of the at least one source-target pair.

In some aspects, the techniques described herein relate to a method, further including: providing a subscription service, the subscription service including the providing the alert of the alteration of the data lineage for the selected data element.

In some aspects, the techniques described herein relate to a method, wherein the subscription service including the providing the alert of the alteration of the data lineage for the selected data element is pluggable into applications throughout the enterprise software system.

In some aspects, the techniques described herein relate to a method, wherein the hierarchical key defining the selected data element is a 5-part hierarchical key.

In some aspects, the techniques described herein relate to a method, wherein the 5-part hierarchical key includes a server name, a database name, a database schema, a database table name, and a database column name.

In some aspects, the techniques described herein relate to a method, further including reconstructing a hierarchical key for each of the at least one computing resources used in the computation of the selected data element.

In some aspects, the techniques described herein relate to a method, wherein the linking the selected data element to the at least one computing resource further includes matching the hierarchical key of the selected data element to a reconstructed hierarchical key of the computing resource.

In some aspects, the techniques described herein relate to a method, wherein the data lineage for the selected data element is computed on a periodic schedule.

In some aspects, the techniques described herein relate to a method, wherein the repository is a metadata repository.

In some aspects, the techniques described herein relate to a method, wherein the parsing the representation of source code to locate and understand computing instructions where the selected data element has been utilized further includes: extracting source data elements and target data elements from at least one source application and target application; loading source code into an enterprise data warehouse; parsing the source code, the parsing including interpreting the source code for actions on data elements; and generating a representation of the source code.

In some aspects, the techniques described herein relate to a method, wherein the computing instructions include at least one of a write, read, or store instruction.

In some aspects, the techniques described herein relate to a method, wherein the parsing the representation of source code to locate and understand computing instructions where each of the at least one computing resources used in the computation of the selected data element has been utilized further includes parsing the representation of source code to locate assignments that write to each of the at least one computing resource used in the computation of the selected data element.

In some aspects, the techniques described herein relate to a method, wherein the determining at least one computing resource used in the computation of the selected data element further includes determining a memory location used in the computation of the selected data element and alternate names for the memory location used in the computation of the selected data element.

In some aspects, the techniques described herein relate to a method, further including: formatting the data lineage for export; and exporting the data lineage for integration into other applications.

In some aspects, the techniques described herein relate to a method, wherein: the representation of source code includes any Extract, Transform, Load (ETL) logic or Business Intelligence (BI) logic embedded in a tool.

In some aspects, the techniques described herein relate to a non-transitory computer-readable medium for retroactively determining data lineage of a selected data element across an enterprise software system, the non-transitory computer-readable medium including instructions stored thereon, that when executed on a processor, perform the steps of: receiving a selection of a data element for tracing across a plurality of disparate software platforms from one end of the enterprise software system to another end of the enterprise software system, the data element defined by a subsequently defined hierarchical key, and the data element stored in a repository; intelligently parsing Business Intelligence (BI) logic including text to locate and understand computing instructions where the selected data element has been utilized, the intelligently parsing including analyzing the Business Intelligence (BI) logic to determine at least one verb that acts on the selected data element and a context in which the at least one verb is used; processing the computing instructions to determine how the selected data element is computed; determining at least one computing resource used in the computation of the selected data element; parsing the Business Intelligence (BI) logic to locate and understand computing instructions where each of the at least one computing resources used in the computation of the selected data element has been utilized; intelligently linking the selected data element to each of the at least one computing resources used in the computation of the selected data element as at least one source-target pair; combining each of the at least one source-target pair to compute a data lineage for the selected data element; displaying the data lineage on a graphical user interface accessible to a user, the data lineage including a graphical data flow for the selected data element from each source-target pair across the plurality of disparate software platforms in the enterprise software system; tracking the data lineage over a time period; determining an alteration of the data lineage for the selected data element, the alteration of the data lineage being a change in the at least one source-target pair across the plurality of disparate software platforms in the enterprise software system over the time period; and providing an alert of the alteration of the data lineage for the selected data element, the alert being an indication of the change in the at least one source-target pair across the plurality of disparate software platforms in the enterprise software system over the time period.

In some aspects, the techniques described herein relate to a computer-implemented method for determining data lineage of a selected data element across an enterprise software system, the method including: receiving, at a processor, a selection of a data element for tracing across a plurality of disparate software platforms from one end of the enterprise software system to another end of the enterprise software system, the data element defined by a subsequently defined hierarchical key, and the data element stored in a repository; intelligently parsing, by the processor, Extract, Transform, Load (ETL) logic including text to locate and understand computing instructions where the selected data element has been utilized, the intelligently parsing including analyzing Extract, Transform, Load (ETL) logic to determine at least one verb that acts on the selected data element and a context in which the at least one verb is used; processing, by the processor, the computing instructions to determine how the selected data element is computed; determining, by the processor, at least one computing resource used in the computation of the selected data element; parsing, by the processor, the Extract, Transform, Load (ETL) logic to locate and understand computing instructions where each of the at least one computing resources used in the computation of the selected data element has been utilized; intelligently linking, by the processor, the selected data element to each of the at least one computing resources used in the computation of the selected data element as at least one source-target pair; combining, by the processor, each of the at least one source-target pair to compute a data lineage for the selected data element; displaying, by the processor, the data lineage on a graphical user interface accessible to a user, the data lineage including a graphical data flow for the selected data element from each source-target pair across the plurality of disparate software platforms in the enterprise software system; tracking, by the processor, the data lineage over a time period, the tracking the data lineage over the time period including: receiving a first date and time input for the tracking of the data lineage over the time period; receiving a second date and time input for the tracking of the data lineage over the time period; and comparing the data lineage at the first date and time input with the data lineage at the second date and time input; determining, by the processor, an alteration of the data lineage for the selected data element, the alteration of the data lineage being a change in the at least one source-target pair across the plurality of disparate software platforms in the enterprise software system over the time period; providing, by the processor, an alert of the alteration of the data lineage for the selected data element, the alert being an indication of the change in the at least one source-target pair across the plurality of disparate software platforms in the enterprise software system over the time period; and displaying the alteration of the data lineage for the selected data element on the graphical user interface accessible to the user, the alteration of the data lineage being the change in the at least one source-target pair over the time period including a change in the graphical data flow for the selected data element from each source-target pair across the plurality of disparate software platforms in the enterprise software system during the time period.

Other features, examples, and embodiments are described below.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1:
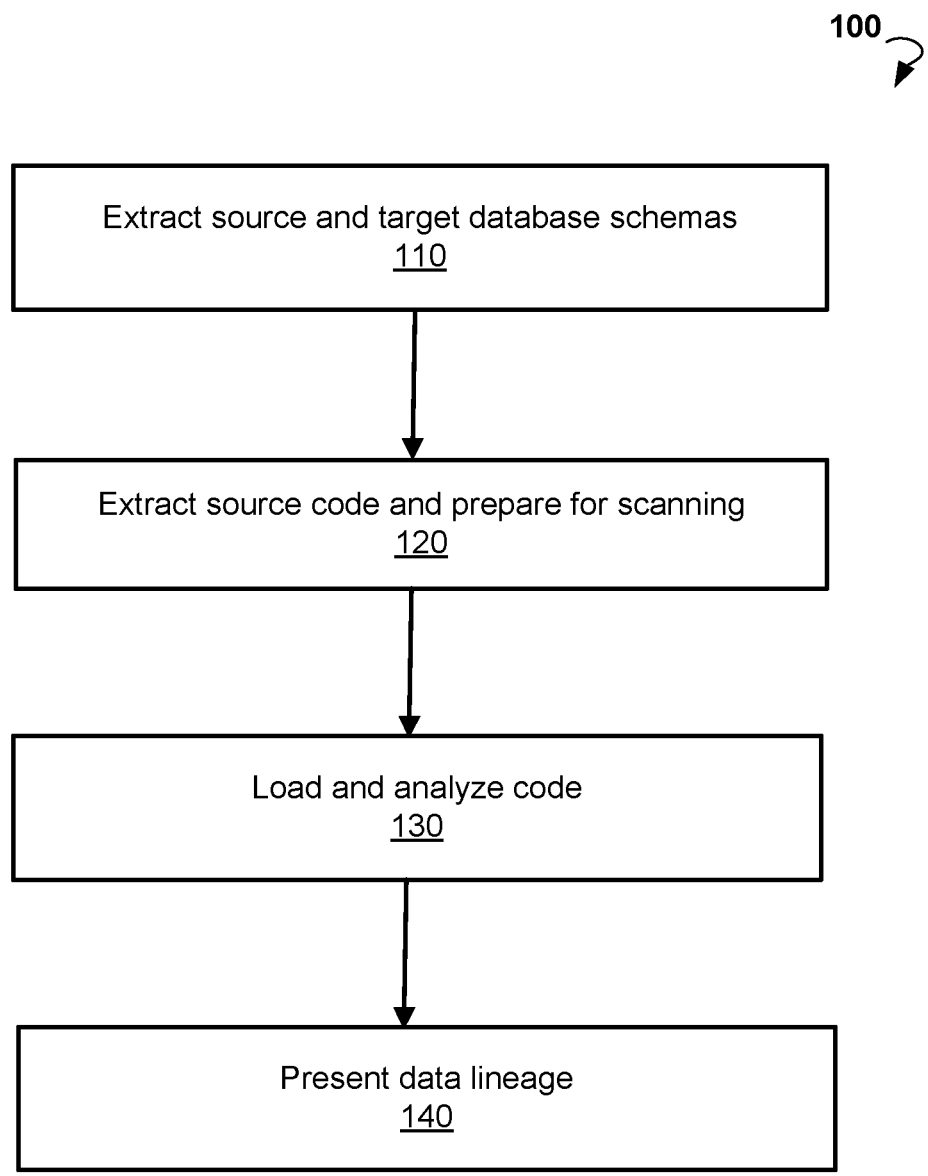
FIG. 1 illustrates an exemplary method for extracting, loading, parsing, and displaying data lineage.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the technology. As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Embodiments of the present disclosure are directed to systems and methods for intelligent metadata management and data lineage tracing. This enterprise data intelligence solution can capture, store, configure, and integrate metadata from multiple sources. It can then disseminate metadata reports and models to consumers and applications in formats customized to individual needs and perspectives. With this metadata tracking, data lineage and data flows can be traced throughout an enterprise's entire Information Technology (IT) landscape from end to end.

The system of the present technology comprises at least one repository for metadata that acts as a data authority of every enterprise data element, including attributes and relationships. The metadata repository can be an enterprise database and/or any other type of mechanism for storing data. The metadata repository can trace each data element from its source application to its use(s) in data warehouses' reports and portals.

Most traditional metadata repositories provide scanning programs which may only scan code by taking in an input string of characters and then attempting to find the same input string of characters in source code provided to the scanning program. However, in various embodiments, the system of the present technology can import database schemas or catalogs, which define data elements, how they are formatted, and the database structure, utilizing extract, load, and transform (ETL) capabilities and then intelligently parse and analyze source code language which allows the system to interpret source code language for verbs that act on data, providing the capability to understand where information is coming from and where it is going at any point in the enterprise IT landscape.

In some embodiments the term source code extends to similar semantic interpretation of any other Extract, Transform, Load (ETL) or Business Intelligence (BI) logic embedded in a tool. using some kind of visual designer and encoding the data flow if any form that can be extracted by an export or an API. In general we can not rely just rely on source code parsing alone but capture and interpret any other atomic building block conveying the same information. For example, ETL is a three-phase process where data is extracted, transformed (e.g., cleaned, sanitized, scrubbed) and loaded into an output data container. The data can be collated from one or more sources and the data may also be output to one or more destinations.

Overall System.

Various embodiments of the present technology are provided with examples using a mainframe computing environment. Embodiments of the present technology are not limited to a mainframe computing environment and may be implemented using any enterprise software system including distributed applications, a cloud environment, a hybrid-cloud, and an on-premises environment. For example, embodiments of the present technology may be implemented as a cloud-based computing environment, such as a virtual machine operating within a computing cloud. In other embodiments, the computing system may itself include a cloud-based computing environment, where the functionalities of the computing system are executed in a distributed fashion. Thus, the computing system, when configured as a computing cloud, may include pluralities of computing devices in various forms, as will be described in greater detail herein.

FIG. 1 displays an exemplary method 100 for extracting, loading, parsing, and displaying data lineage. At step 110, the system extracts all source and target database schemas. At step 120, source code is extracted and prepared for scanning. The source code can be in any format in one or more programming languages. For example, source code for one application operating on an enterprise IT landscape may be written in a different programming language than source code for a second application operating on the same enterprise IT landscape. Moreover, a large enterprise may have more than one line of business, each utilizing different types of software. For example, point of sales software at a retail location can be different from accounting software used by a back office, etc. In any embodiment, the source code to be analyzed is extracted and prepared for scanning, regardless of the programming language or format of the source code.

In an exemplary embodiment where the source code is in JAVA, there are at least two methods by which the source code can be extracted and prepared for scanning at step 120. In the first exemplary method, the source code can be prepared for scanning by extracting the source code into a folder structure, and the folder subsequently scanned. In the second exemplary method, a network administrator selects the branch location where the source code is located, and the code is directly and automatically extracted to an interface that connects to source configuration files.

In various embodiments, when source code is scanned, the automated system of the present disclosure looks for schema of databases, data elements, and how they're formatted and structured within the database. It combines that information with enterprise specific information to provide enterprise specific intelligence regarding where information is stored, and how the information traverses the different technologies in an enterprise IT data landscape. In this way, information about transformation of data throughout an enterprise IT landscape can be gleaned. Information regarding how data was manipulated to arrive at a final graphic on a business report can be found.

At step 130, the code is loaded into a data warehouse by an ETL tool, and the system analyzes and parses the code to provide a full understanding of the entire code. As discussed herein, the source code is analyzed regardless of which one or more programming languages are used in the source code. Embodiments of the present invention provide for a plurality of code scanners (over 200 different code scanners) that are utilized to parse through the extracted source code. While other metadata managers may provide information about a particular database catalog, they do not provide information regarding where the information in the database is sourced from or where that information is being delivered. With the 200+ code scanners available to the automated system of the present disclosure, data can be scanned from any technology landscape (mainframes, RDBMS, Java, etc.) to the reporting environment.

In loading the code, the relevant information (such as metadata information) can be stored in a repository. Thus, every time something changes in the code, an incremental analysis can be conducted to see what has changed since the previous code analysis. The data lineage presented herein is generally a snapshot of the flow of a selected data element throughout enterprise systems through time. In various embodiments, the data lineage snapshot can be run on a periodic basis, such as daily, weekly, biweekly, monthly, annually, or at any other time increment. In other embodiments, the data lineage can be run as directed by a user. Embodiments of the present disclosure track metadata changes and not the data itself. While data may change quickly (from one second to the next), schema typically does not change as quickly. Further, there are times when data may remain static, but the metadata changes due to a renaming, reformatting, or reorganizing of the data.

If a user edits a file field in one application program that feeds many other (target) systems, which eventually goes on a report that is submitted by an enterprise to an auditor or government reporting agency, the full impact of the initial edit to the singular file field in the application program needs to be understood. An enterprise may trace how the one file field in that application program affects all of the intermediate systems and destination system. In various embodiments, a user can select a graphic, table, or figure on a business intelligence output report and trace the full lineage of how that graphic, table, or figure was computed, and every location within the enterprise IT systems where that data was read, stored, or written. Furthermore, data can be traced in a forward manner as well. For example, a user can find a source that has social security numbers in it, select a social security number, and see the impact analysis of the social security number, and/or every location where that number is read, stored, or written in downstream systems of the enterprise.

One exemplary method for conducting this input/output analysis of Java code is with dynamic SQL. This requires several layers of understanding with different technology stacks involved to be able to trace and compute the lineage. Through multilayered semantic augmentation (discussed further below), first the Java code itself is analyzed, then the system determines where dynamic SQL is operating. An analysis of the dynamic SQL framework enriches and augments the previous analysis. Although Java and dynamic SQL are described here, the present disclosure is equally applicable to all programming languages, technologies, and platforms.

Traditional code scanning merely takes an input string of characters and identifies where in the source code that particular string of characters occurs. However, this is an insufficient mechanism for tracking a data field through an entire end-to-end enterprise system, from mainframe to business output. For example, a data field may be concatenated, transformed, renamed, or simply formatted differently in different applications utilized throughout an enterprise. Thus, a simple search for an exact character string does not capture the full spectrum and all data transformations that occur to a data field throughout an entire enterprise system.

In embodiments of the present disclosure, intelligent code parsing is used. The code parser not only scans the source code, but also interprets the source code language for verbs that act on the data, to better track all transformations of data through all systems within the enterprise. For example, a simple language translator may identify a word (such as "ice"), but that does not automatically yield an understanding of the meaning of that word. To fully understand the meaning of a word, one needs to understand whether it is a verb, subject, adjective, etc. as well as understand the context in which the word is used. For example, the word "ice" may be a noun referring to an ice cube, or it may be a verb used to denote an action; one will not know how to interpret the word "ice" without also analyzing the context in which the word is used. Similarly, a traditional code scanner may identify a character string, but the code parser of the present disclosure can identify not just where the data occurs, but also the context in which it is used, where the data came from, where it is going, and how it has been transformed. In this way, an understanding can be gleaned of the source code by extracting the meaning of what the code is doing, rather than simply identifying a character string without context. This further allows the lineage to be determined from an end of an enterprise's IT landscape (such as an output Business Intelligence tool), all the way to the other end of the IT landscape (such as a mainframe). By understanding the meaning of code, data lineage can be traced across applications, technologies, systems, programming languages, etc. A business intelligence tool can comprise any business reporting tool, such as IBM Cognos, MicroStrategy, Tableau, SAP Business Objects, etc.

In some embodiments, the code is output in fine-grain detail of dynamic SQL. Based on the result set, data flow and transformations, such as how the data is being calculated or how the data is being aggregated to get from one hop to the next, are displayed as data lineage at step 140. The lineage is presented as a data flow, and it allows a user to follow step-by-step what method is being used and called and analyze method-to-method in addition to table-to-table. The control flow helps illuminate what method is being used and called at each step. The system parses through many classes, statements, code, and then outputs to table/columns. In this way, data lineage is traced and displayed from its origin, through all of its transformations, all the way to the output.

In an exemplary embodiment of Java code, dynamic SQL is typically SQL fragments stored in a string query that need to be reconstructed across several methods to connect source(s) and target(s). For an SQL query, embodiments of the present disclosure typically search for extract, transform, and load operations. Information flows from source tables to target tables, and the system needs to understand the methods, locations, and building blocks of the string queries. For Java, the automated system parses through all the building blocks of Java (classes, statements, code) and searches for the table/columns (the database aspect) to establish the flow between each source and target.

As discussed above, in tracing the lineage of a data element, source and target relationships are used. There can be one or more sources and one or more targets at each step. For example, a customer identification number (such as a telephone number, social security number, or any other identifier) may be stored in different applications of an enterprise. A customer-interfacing system may have the customer identification number as an input, and that data could be transmitted to one or more databases for tracking the customer's purchasing activity. In this scenario there is one original source transmitting the data to multiple targets. In other embodiments, the customer identification number can be entered into different applications individually, and thus there are multiple sources. These multiple sources may all lead into one target database table, or into multiple target database tables. For each step of the process, or "hop", there are one or more sources and one or more targets (also referred to herein as destinations). For lineage tracing, every place where the data has persisted (stored, read, written) is identified and traced.

A user may access the results of the automated system disclosed herein via a web-based browser interface into a visual editing environment containing a view into the metadata repository. The repository view depicts all data elements about which metadata has been collected. It can be searched to find a particular item of interest, and selected to get further information regarding that data item's lineage.

Furthermore, with the metadata repository of the present disclosure, an end user can view a business report and know how the information presented on the report is defined. For example, a business report may report a total amount of revenue, which is from multiple sources. By selecting the revenue field, sources that contributed to that revenue field are illuminated (such as different lines of business of an enterprise), as well a certified definition of what the "revenue" field on the report is referring to, i.e., sales revenue, product revenue, etc. From this view, a user can see everywhere that type of revenue exists and where the revenue numbers are sourced from. Thus, information about the source of the revenue and how it's transformed to arrive at the final value on the business report can be gleaned through the metadata repository and data lineage tracing systems and methods disclosed herein.

Data Lineage Determination and Tracing.

Embodiments of the present disclosure allow for backward data lineage tracing that maps the output of parsed programs backwards through the IT systems to their inputs. For example, an item on a report or graphic displayed on an end Business Intelligence tool may be selected and that data can be traced throughout the enterprise IT landscape to determine where the data came from and how and where it was transformed to arrive at the final graphic or value on the end report. Forward data lineage may also be utilized in some embodiments, where inputs of parsed programs are mapped to outputs.

Data lineage can be described generally as a kind of data life cycle that includes the data's origins and where it moves over time. This term can also describe what happens to data as it goes through diverse processes. Data lineage can help with efforts to analyze how information is used and to track key bits of information that serve a particular purpose.

In exemplary embodiments, data lineage is implemented in an enterprise to represent programming artifacts by the means of navigable abstract syntax trees, which have information system wide cross-references between them. For example, an SQL (Structured Query Language) table can be represented by a tree with a root node corresponding to the table, and a child node for each column of the table. The SQL table is connected to the SQL commands that use it by the means of a link between the logical table (the use of the table in the command) and the physical table (its definition). The uses of the columns are similarly represented and connected.

Figure 2:
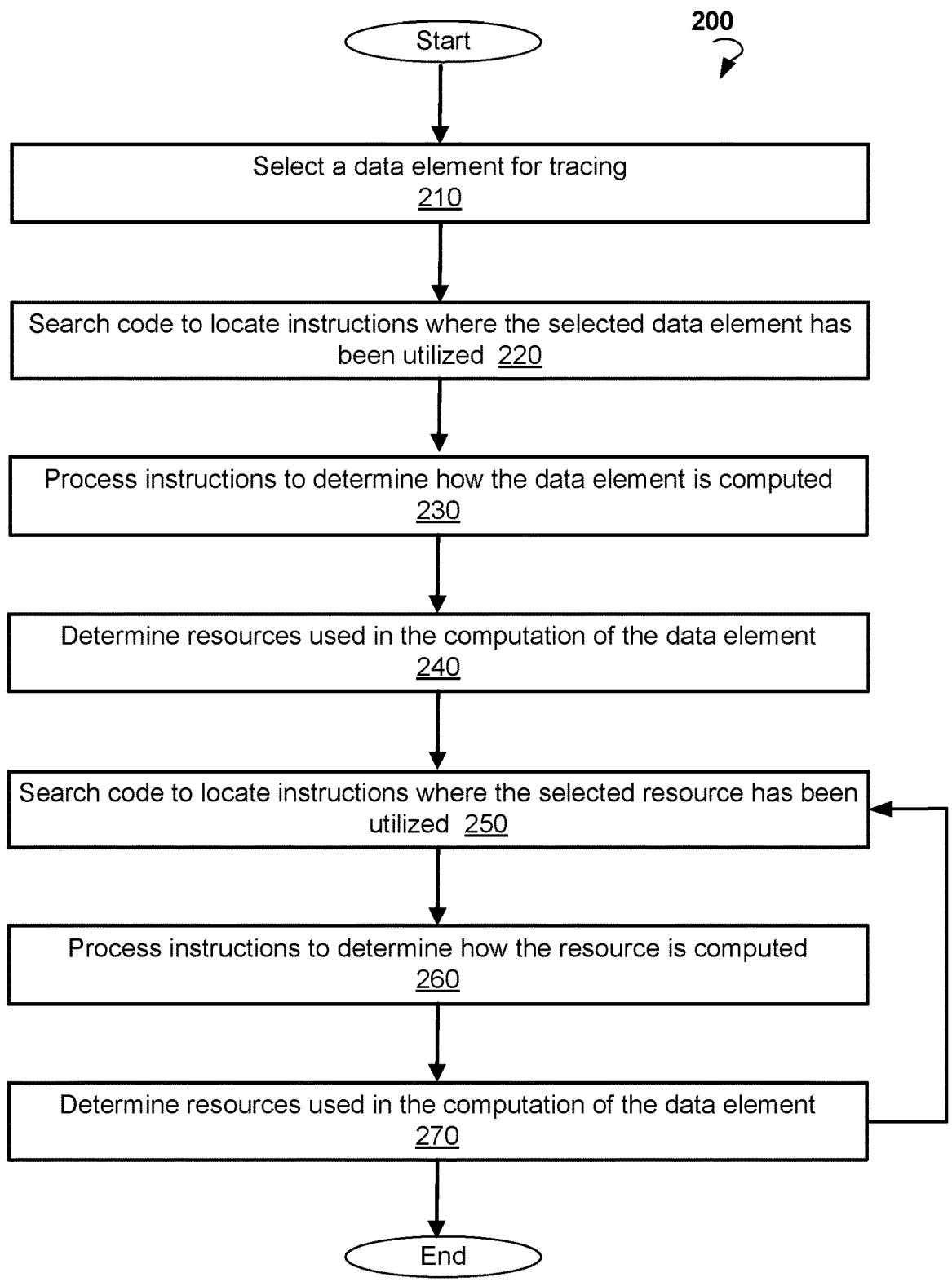
FIG. 2 illustrates an exemplary method for data lineage modeling.

Embodiments of the present disclosure allow for many different technologies to be uniformly modeled. FIG. 2 depicts an exemplary method 200 for data lineage modeling. The method for data lineage modeling starts with a selected data item 210 (also referred to herein as data element) to be traced. The selected data item can be a singular data field, value, or represent a table or view column, or a sub-zone of a buffer. The disclosed system then searches internal representation of the code (an augmented semantic graph) for the instructions where the data item has been utilized (such as written or updated) in step 220. The augmented semantic graph is based on source code that has previously been parsed and stored in a way that enables navigation/exploration of other algorithms necessary for further extended information.

In step 230, the disclosed system crawls through the instructions in order to find out how the data item is computed through the declaration of the data item, in order to handle the aliasing within complex structures like groups with REDEFINES clauses in COBOL programs, until reaching the resources in step 240 that have been used in the computation of the data item. These resources are data items, i.e., table or view columns or sub-zones of buffers that are read by the program. The navigation in the code does not rely on the control graph of the program, i.e., the computation is flow-insensitive. Then the process is repeated on these resources: it searches for all the instructions where they are written or updated in step 250, and it crawls through the code in step 260 in order to reach their resources in step 270. The process is repeated until all resources are reached that contributed directly and indirectly to the computation of the starting data item and that are only read within the boundaries of the information system as loaded in a repository (e.g., CAE database) (i.e., the origin(s) of the starting data item have been discovered.) Through this recursive process, all resources are discovered, as either a source or a target.

The results of the computation are presented through a graph that connects data items/data stores to their immediate resource, and numerous sets that contain the gathered data items and data stores. One can have a very detailed view of the process at the individual instruction level. The transformations crossed during the process are also gathered.

In an exemplary environment of SQL code, an SQL table column can be reached when it is used in the SELECT list of view or in a SELECT list of an SQL query in a parsed program or a stored procedure. From there, the automated system navigates to the uses of the column within INSERT or UPDATE commands involving the column. Then the processing of the instructions within the reached programs begins.

An SQL view column can be reached under the same circumstances as a table column. From the column defined by the view the automated system navigates to the matching expressions for the corresponding query blocks of the view (there are several such blocks when the query blocks are connected with UNION, INTERSECT, or MINUS). If the columns in the SELECT lists refer to derived tables (SQL SERVER parlance) or inline views (ORACLE parlance), the automated system digs into their SELECT lists until reaching columns of tables or views defined in the Data Model. Updatable views are also evaluated. Stored procedures and triggers are modelled as parsed programs (see below).

Data lineage tracing can support any number of platforms and technologies, such as various SQL dialects, ADABAS, IDMS, IMS DL1, SPITAB, DATACOM. It also supports CICS, which resembles in the modelling of its data accesses to data accesses from some data management systems above.

Parsing Code.

A complete enterprise software portfolio can be analyzed to produce end-to-end lineage of data elements. Through end-to-end capture, a user can understand even a data warehouse workflow in its execution context, such as a distributed ETL where parameters and triggers are defined remotely, from a mainframe for example.

Detailed code parsing, intelligent linking, and layers of semantic augmentation are used to trace data elements throughout an enterprise IT landscape. The system understands how the data moves from A to B internally and across several technology layers, frameworks, API, running context, etc. For instance, dynamic SQL requires special intelligence to reconstruct the SQL fragments.

Embodiments of the present disclosure provide for a holistic approach to resolve the data store for a given program as each program is scheduled or scripted to be executed. Other solutions typically use loose, string matching, rule-based type resolution, which are error prone and unreliable.

Furthermore, embodiments of the present disclosure also use several levels of "semantic augmentation" in parsing code. By using a syntactic or grammar parse, grammar rules are coded in automates as states and transitions.

An exemplary multi-layer semantic parse may comprise four levels. In the first level, grammar rules are interpreted to build an AST (abstract syntax tree). In the second level, the AST is processed to deduce other information, e.g., to retrieve accessed tables in the calling parameters of a function. In the third level, enterprise specific processing is done, e.g., retrieve the return value of a specific Java method for all classes implementing a given interface and create a LOGICAL TABLE object with this value. In this fourth level, additional interpretation is completed based on the text. For example, identification of items really accessed by an SQL statement (requires knowledge of the database dictionary) and/or identification of the type of files accessed by a program, like disk, tape, print (requires knowledge of the JCLs, or scripts calling the program parsed.

As would be understood by persons of ordinary skill in the art, although four levels of semantic parsing are discussed here, any number of levels of semantic parsing may be used. The results of each level are augmented to arrive at the output.

Exemplary Method for Computing Data Lineage.

Figure 3:
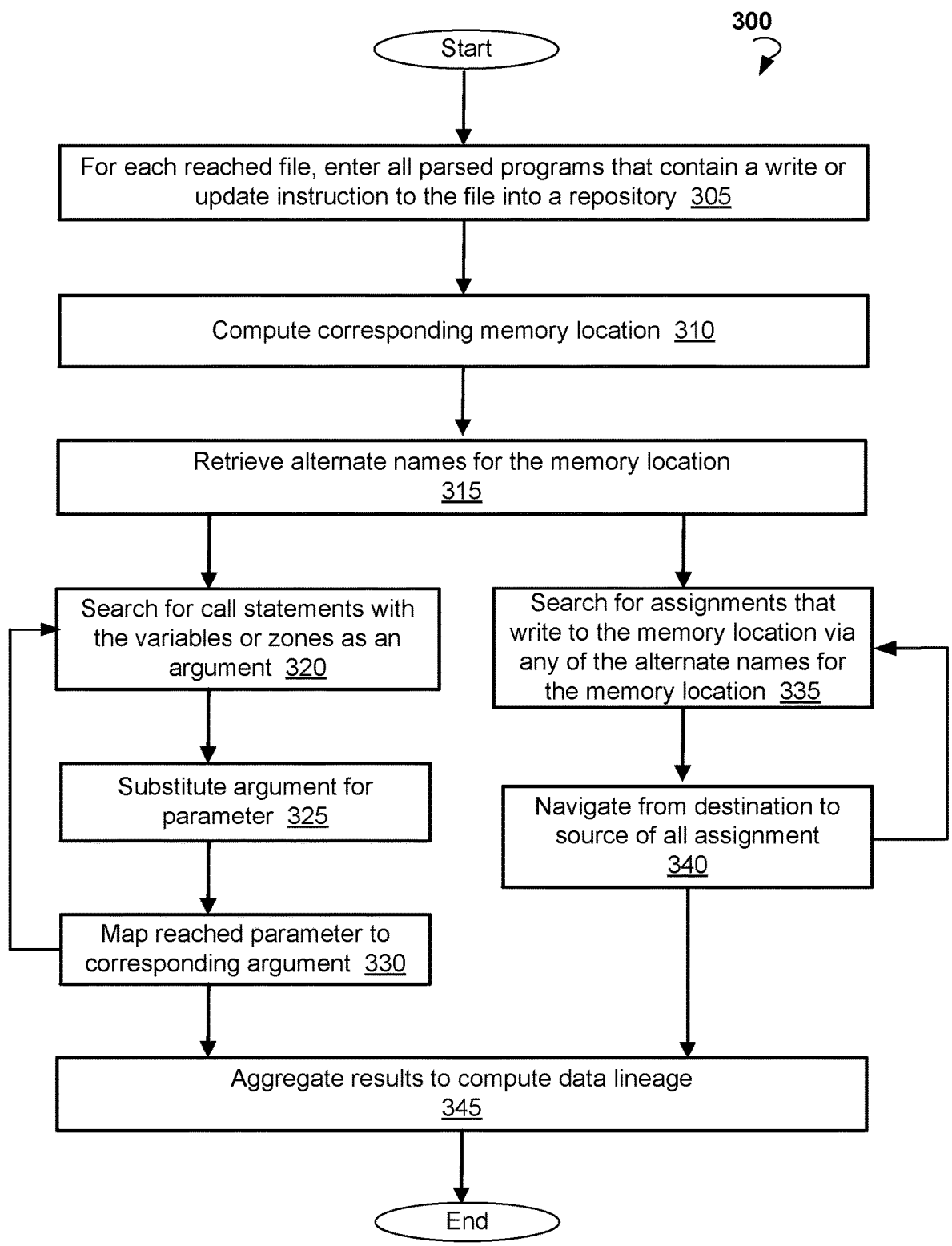
FIG. 3 illustrates an exemplary method to parse code and determine data lineage.

FIG. 3 depicts an exemplary flowchart for a method 300 to parse code and determine data lineage. For each reached file, all the parsed programs that contain a write or update instruction to the file are entered in the repository in step 305. Typically, only a sub-zone of the buffer of the write or update instruction is impacted. Then the memory location corresponding to this sub-zone is computed in step 310 and the alternate names for that memory location are retrieved in step 315. For these variables or zones, the system searches for the sub-routine call statements with these variables or zones as an argument in step 320. The system also searches for all the assignments that write to that memory location through the use of any of the retrieved alternate names in step 335.

For assignments, the automated system navigates from the destination to the source of the assignment in step 340, and goes down the expression tree in order to reach all the variables or zones involved in the computation of the source expression.

For call statements, the argument (eventually partially) reached is substituted by the (eventually partial) parameter of the sub-routine in step 325 and an auxiliary data lineage is started for this (sub-) zone of the parameter. This auxiliary data lineage may reach (other) parameters of the sub-routine or columns and buffers involved in IO (Input/Output referring to any methods which read or writes from a data store).

In the case of parameters, the reached parameter is mapped to the corresponding argument of the sub-routine call that started the auxiliary data lineage in step 330, and the auxiliary data lineage is summed up by a link from the (partial) argument that started the computation to the (partial) argument that has been reached at the end of this computation. Since the automated system only goes back to the call site at the end of this auxiliary computation, data lineage is context-sensitive.

In the case of an IO, the reached column or buffer sub-zone is given back verbatim to the caller site in order to keep track of this side-effect, and this auxiliary data lineage is summed up by a link between the (partial) argument that started the computation and the reached column or buffer sub-zone.

It may happen that the automated system enters a program not through the main program, but through a sub-routine. In this case there is no caller site to go back to, and therefore, when a sub-zone of a parameter is reached, one goes from the sub-routine to any program that calls this sub-routine. The exploration of the sub-routine is summed up by a link between the column or buffer with which the sub-routine was entered and the substituted argument (at every call site of the sub-routine) corresponding to the reached parameter. For example, if a sub-routine is entered through a file F, the automated system continues only with those programs that are linked to steps that allocate F to a logical file used by the program.

In this way, all the columns or buffers that are read by the program or by its sub-routines are discovered, as well as those that contributed to the computation of the data item with which the program was entered (a column or a sub-zone of buffer).

The automated system can then exit the program and either crawl through the data model, or reach some utility processing step, or enter another parsed program through an instruction that writes or updates the reached data store. If a program is reached several times, but with different files, the program is not processed again in detail, but a summary is built on the fly of the program that maps the relevant outputs to the reached inputs is used.

A parsed program can also be reached through columns of tables or views that are used in INSERT or UPDATE statements within the program. Once such a column is reached the automated system navigates to the corresponding expression in the SELECT/VALUES list of the INSERT or the right hand side of the corresponding assignment in the SET clause of the UPDATE. The reached expressions may contain other columns or host variables, which are then processed to dig deeper into the program. Within the program, the processing is the same as described above.

A program may also be exited through SELECT queries: in this case navigation is from the host variable previously reached to the corresponding column of the table or the view in the SELECT query blocks. The SELECT lists of derived tables (SQL SERVER) or inline views (Oracle) are handled as in the case of views. In this way, the automated system processes files and SQL tables or views. In various embodiments, other Data Management Systems are modeled either through buffer accesses like the ones for files, or data access commands through columns as in SQL. The results are aggregated, and data lineage is computed in step 345.

Figures 4A, 4B:
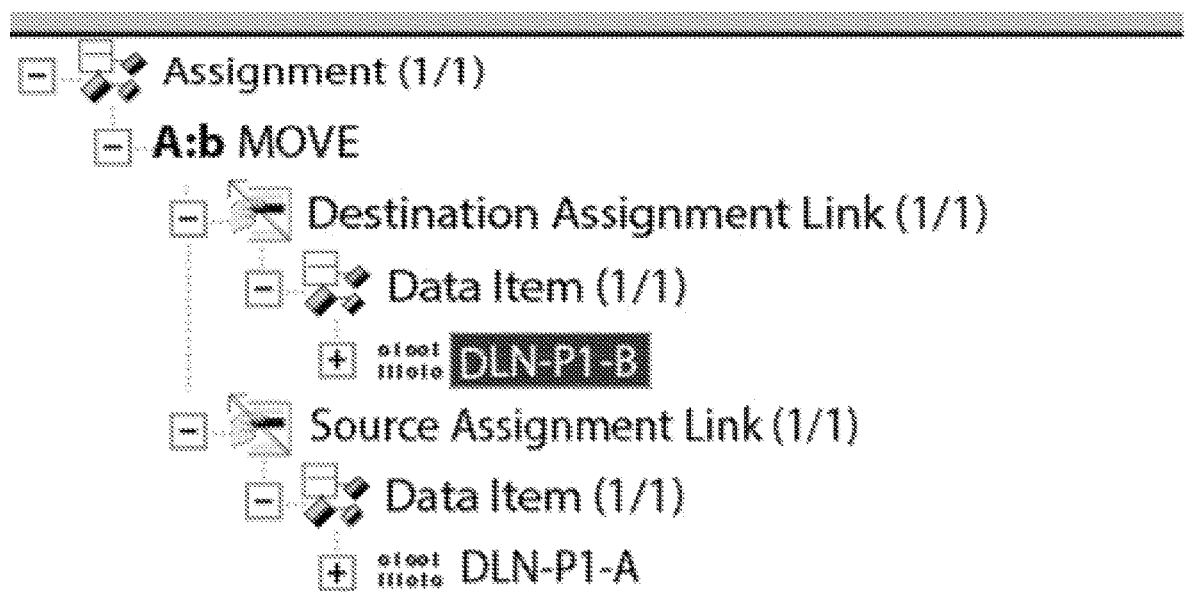
FIGS. 4A through 4N illustrate exemplary steps of methods for tracing data lineage.
Figure 4C:
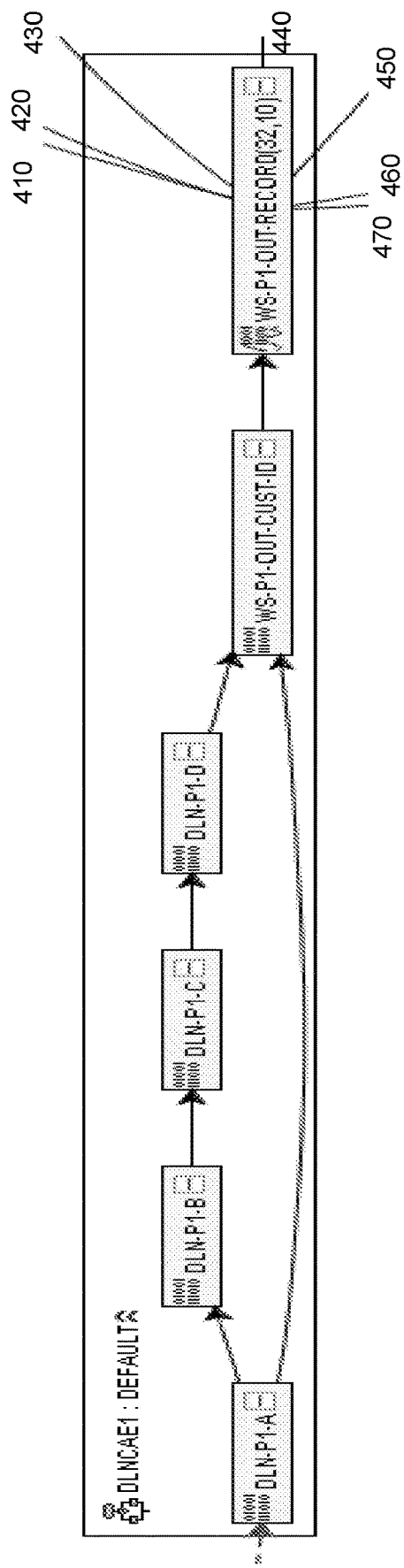

FIG. 4A depicts an exemplary COBOL MOVE statement that is present in source code that is being parsed. From this statement of "MOVE DLN-P1-A TO DLN-P1-B", the automated system of the present disclosure can understand the semantics present in the code to store the data item as an assignment with source and destination links. FIG. 4B depicts that an assignment has been determined with source DLN-P1-A and a destination of DLN-P1-B. In this way, the exemplary COBOL MOVE statement from FIG. 4A has been parsed to determine a source and destination assignment. Continuing this process may yield an internal detailed lineage for an exemplary program DLNCAE1, as depicted in FIGS. 4C and 4H-4I. Reference numbers 410, 420, 430, 440, 450, 460, 470, and 475 depict the data lineage flow from FIGS. 4C to 4H and 4I.

Figure 4D:
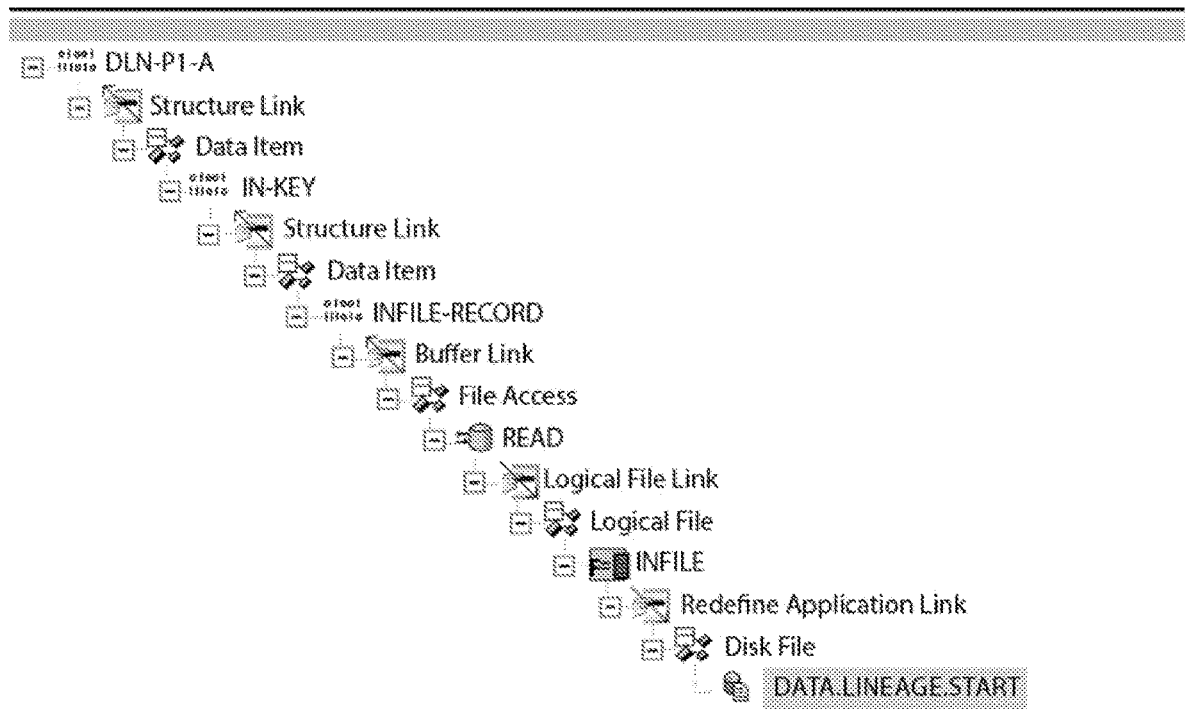
Figure 4E:
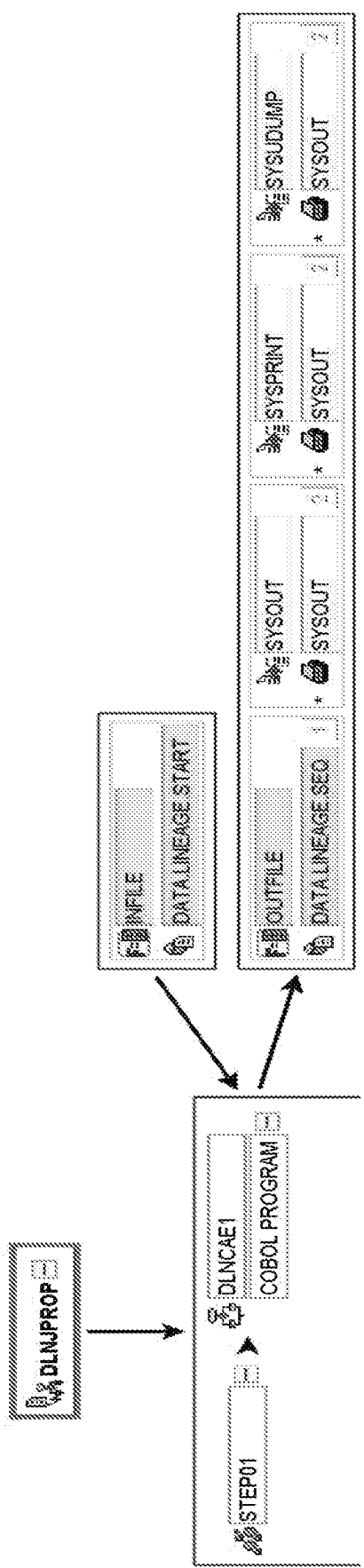

An exemplary runtime configuration needed to establish a data store to the internal data flow is depicted in FIG. 4D. Further analysis of the code parse determines that data DLN-P1-A is a nested element of a data structure which is read from a file, but the file name is not known within the program. Rather, the determination of the file requires knowledge consolidation between COBOL syntax and JCL syntax. In exemplary FIG. 4E, the automated system has determined that JCL DLNJPROP executes COBOL program DLNCAE1 and assigns data file DATA.LINEAGE.START for internal file name INFILE.

Figure 4F:
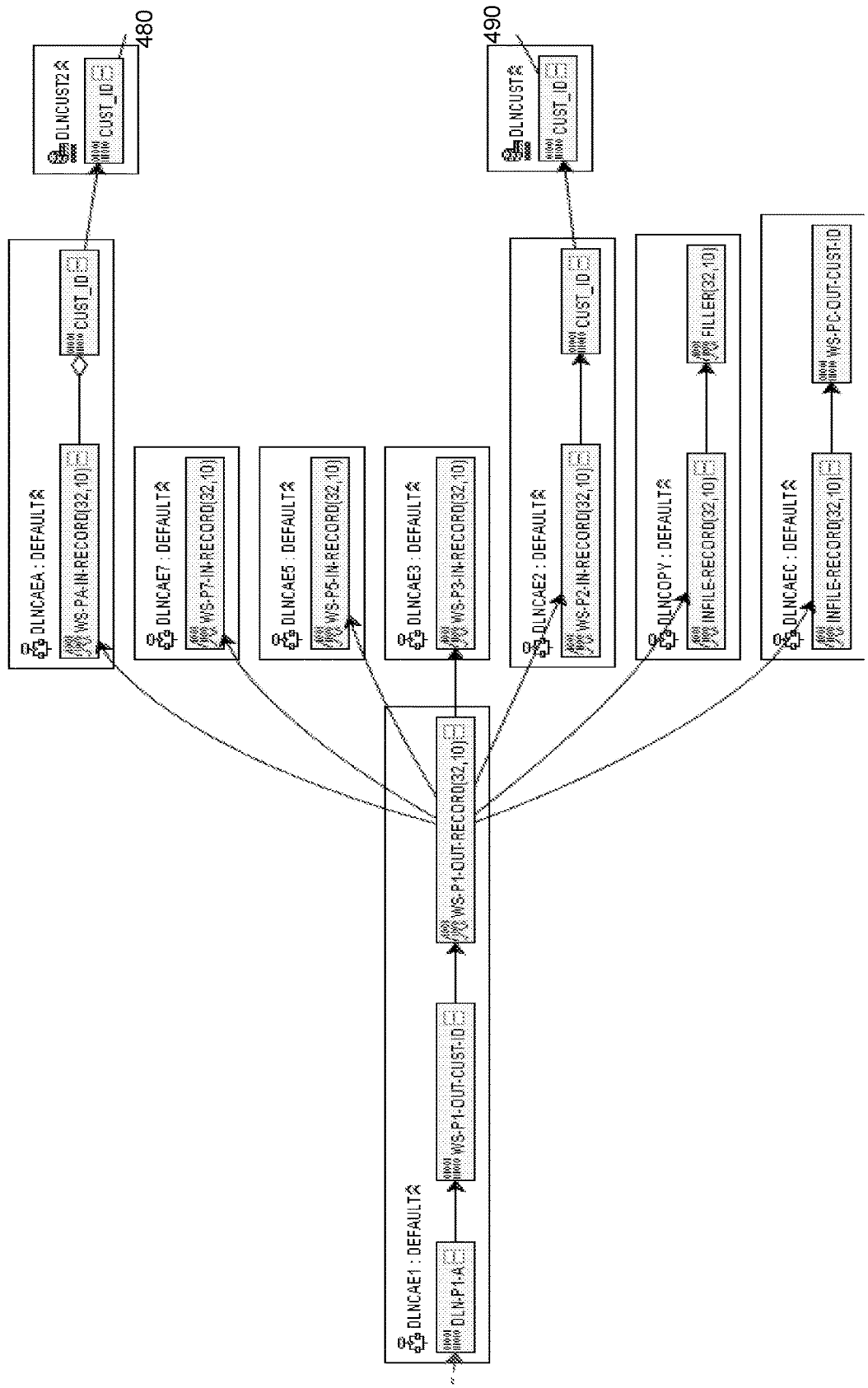
Figure 4G:
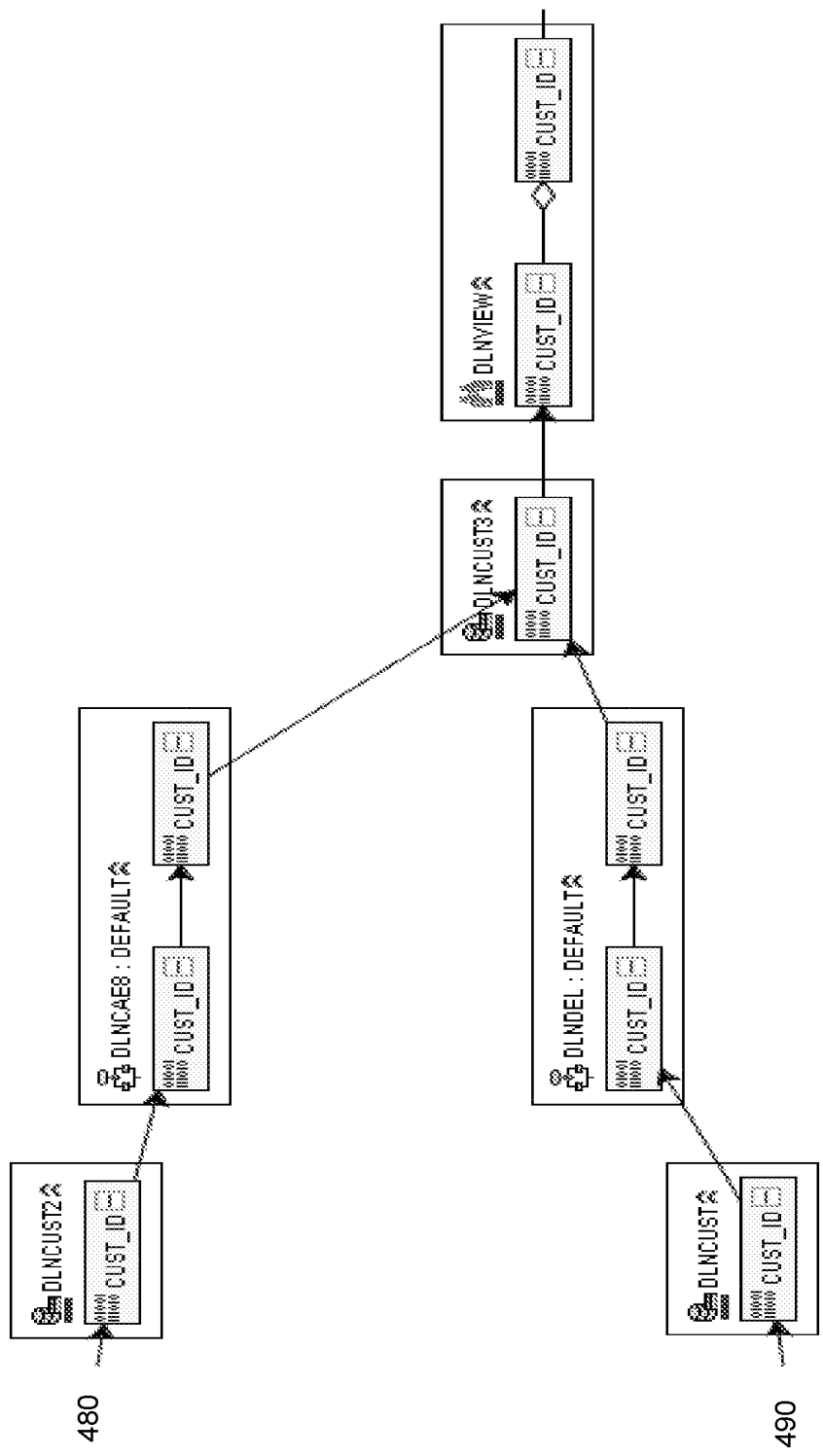
Figure 4H:
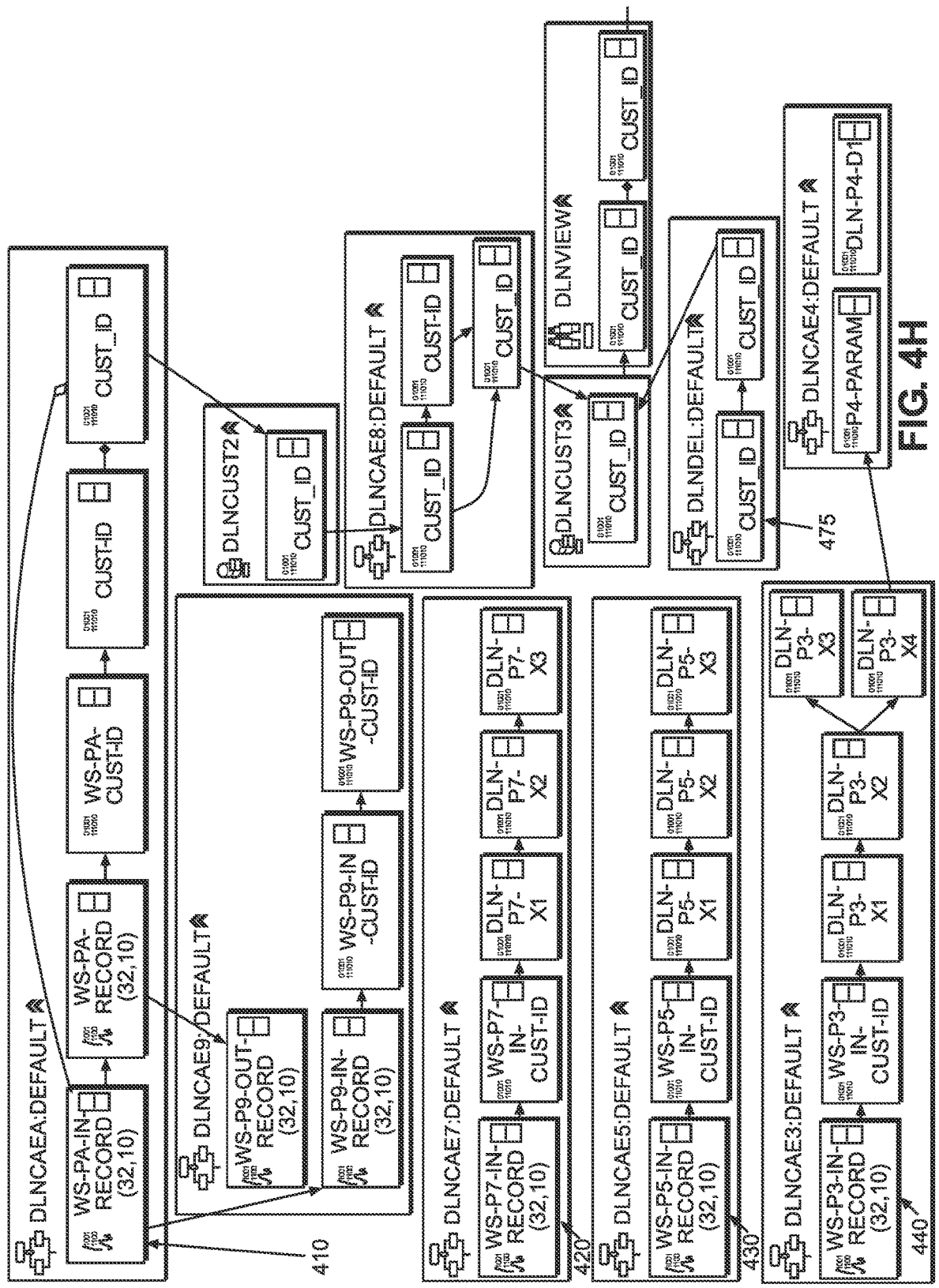
Figure 4I:
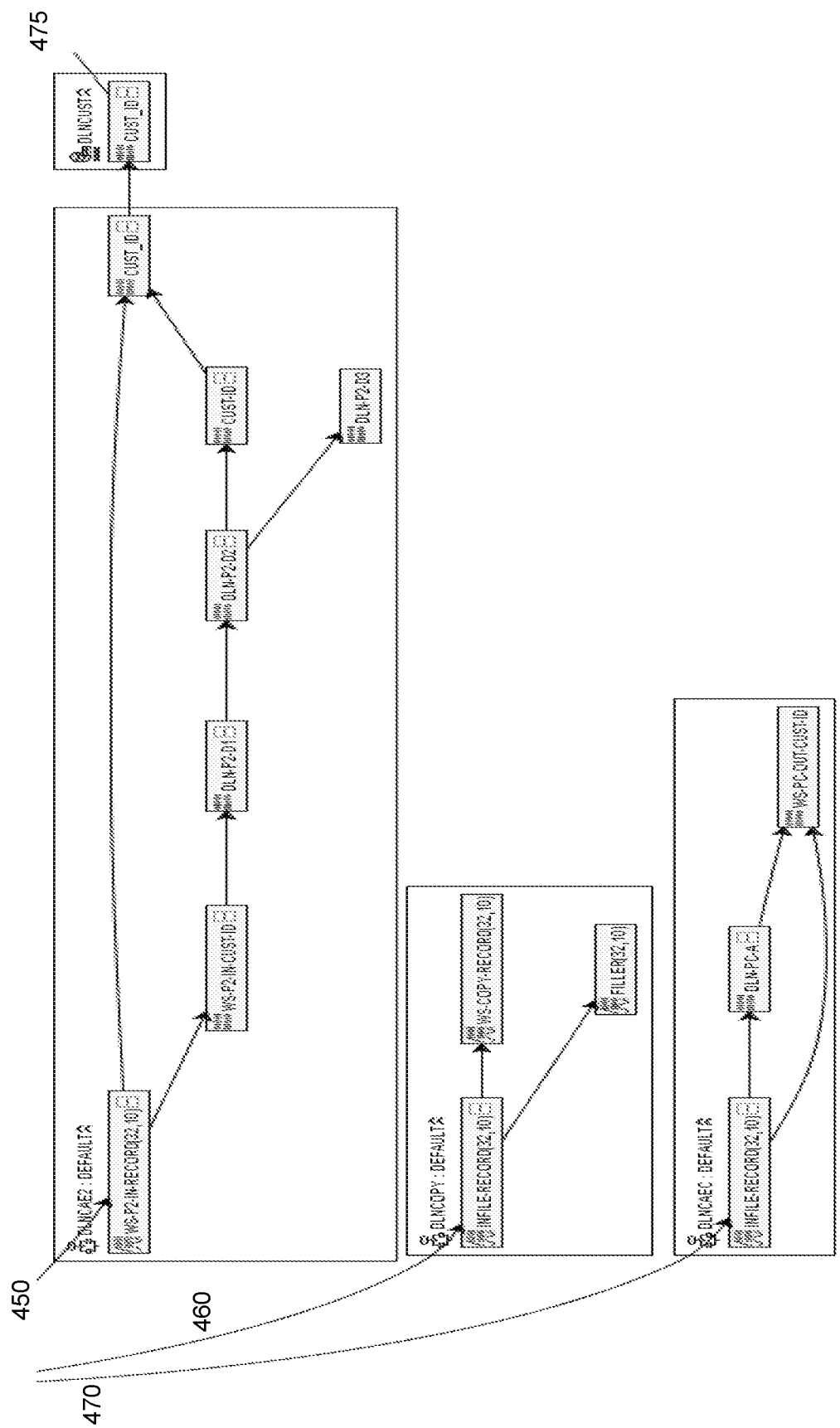
Figure 4J:
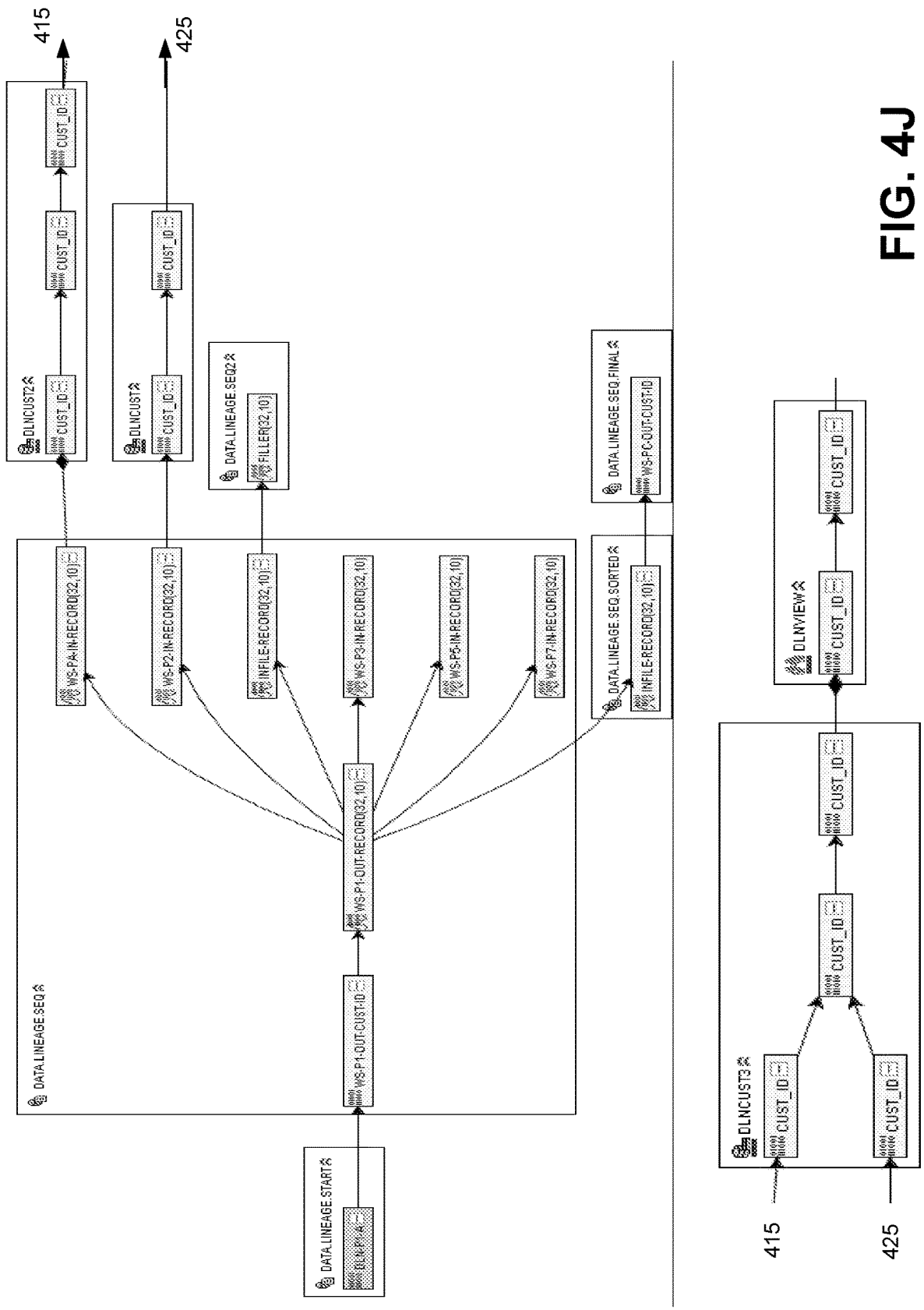
Figure 4K:
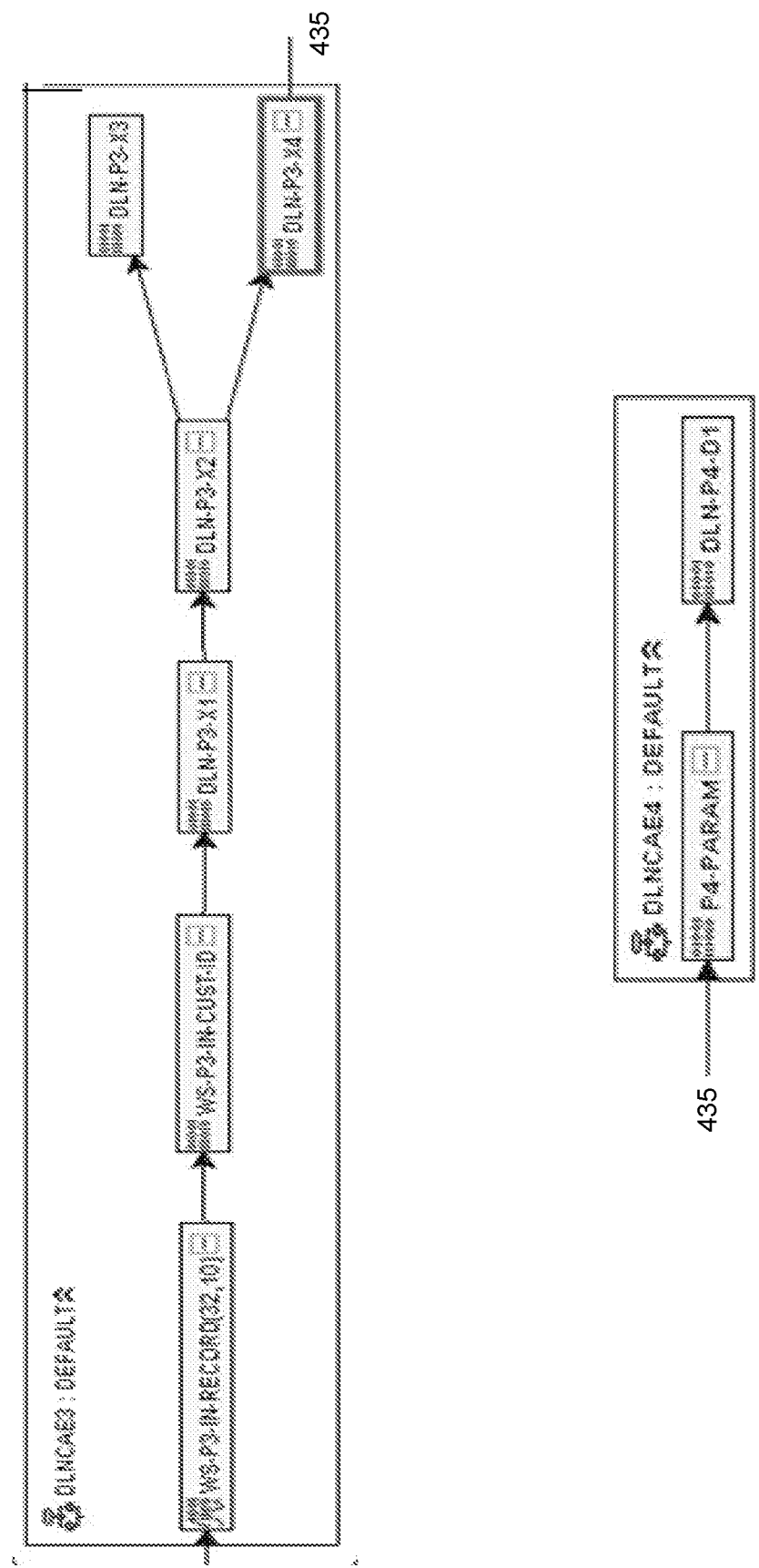
Figure 4L:
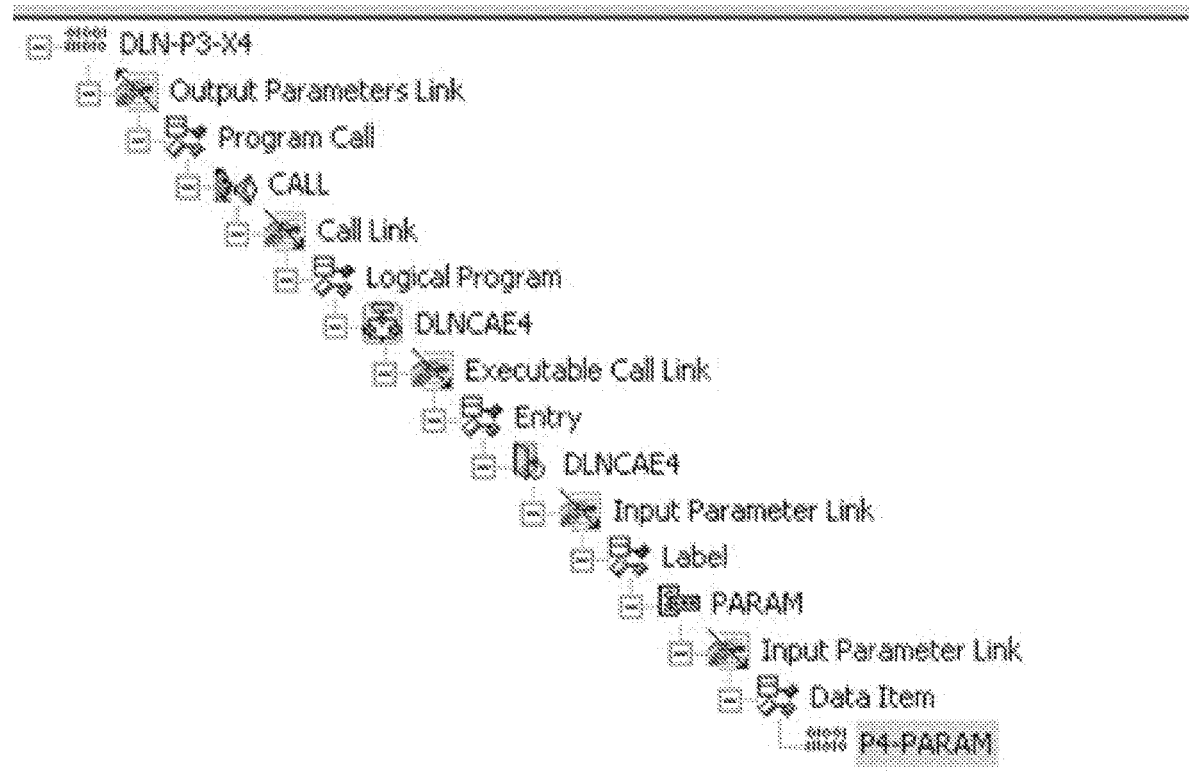

There can be different levels of details regarding lineage. Exemplary FIGS. 4F-4G depicts a program view of lineage showing source and targets. Reference numbers 480 and 490 depict the data lineage flow from FIG. 4F to FIG. 4G. Exemplary FIGS. 4H-4I depict an extract of detailed lineage with intermediate data flow. Exemplary FIG. 4J depicts an aggregated view of lineage that is data store centric. Reference numbers 415 and 425 depict the data lineage flow from in the figure. Exemplary FIGS. 4K and 4L depict detailed knowledge for tracing lineage via a call with parameters. Reference number 435 in FIG. 4K depicts the data lineage flow in the figure.

Figures 4M, 4N:
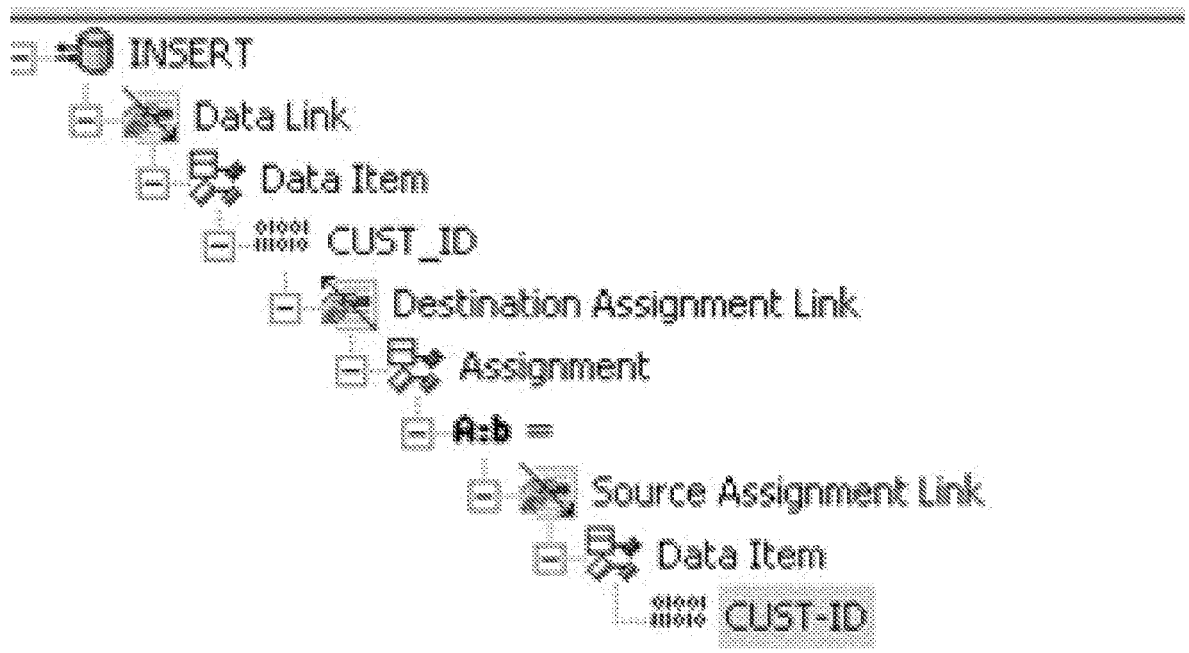

Exemplary FIGS. 4M and 4N depict an example of SQL internal data flow from a source code statement and a corresponding syntax tree.

Combining Data Flow Paths.

In embodiments of the present disclosure, the data element objects, and data flow objects are loaded into the enterprise warehouse (repository) as a result of parsing source code libraries, data catalogs etc. These form the base for the determination of paths of flows (containing data lineage and other valuable information) as described herein. The data element and data flow objects can be inserted into the repository independently of one another, in any sequence. Further, data elements and data flow objects can be copied from one repository (e.g., representing data of a certain line of business) to another repository, where the copied objects add information about the data flows between data elements and provide therefore a more comprehensive data lineage, e.g., on an enterprise level.

A data element loaded in the enterprise data warehouse (the metadata repository), is uniquely identified by a hierarchical key, thus making the data element fully qualified. In exemplary embodiments, the hierarchical key can be a 5-part hierarchical key. If a data element is from a database, for example, the 5-part key may consist of the server at which the database resides, name of the database, the database schema or user, the database table, and the column name from the table. For other types of data components other than databases, the 5-part key may comprise other attributes describing its type, e.g., a file in a file system, a user name, server where the resource resides, and other aspects. In other embodiments, the hierarchical key can comprise fewer than 5 parts, more than 5 parts, or different components than those specifically listed herein.

Through the use of the hierarchical key, a data element is fully qualified, so it is very unique. For example, if a user searches for a data element by simply searching for a string of characters (such as a first name for a customer), then multiple results may be returned for that name that may not actually be the same person. By fully qualifying a data element with a 5-part hierarchical key, the automated system of the present disclosure minimizes the likelihood of returning a false positive result in its search for a selected data element throughout the enterprise IT landscape. The hierarchical key creates a unique key that links source and targets to create a data lineage.

When a database is tracked throughout the enterprise IT landscape, the location at which the database resides is typically known. However, when application source code is evaluated, multiple locations may need to be analyzed to establish the links between source and target locations. This is because a full understanding needs to be gleaned of how each logic/program in an application is accessing the data store in its execution of the program.

For example, a selected data element to be traced may have a 5-part hierarchical key noted in a metadata repository. When an SQL statement is written in a computer program, the statement may call a specific table in a database, which may match the table name of the 5-part key for the selected data element. However, to ensure that the table in the SQL statement is the correct one for linking with the selected data element, all other attributes of the 5-part key from the selected data element also need to be matched to the table in the SQL statement.

Since the SQL statement only lists the database table name, the 5-part key for the resource being called by the SQL statement will need to be reconstructed by analyzing multiple locations to reveal it. In one embodiment, while the application code is operating, the automated statement may wait to determine which resource is actually accessed by the source code. From that access, the other elements of the hierarchical key may be found, such as database name, schema, and server location of database may be determined. In various embodiments, multiple places may need to be evaluated to fully determine the elements of the hierarchical key. If the reconstructed hierarchical key for the table called in the SQL statement matches the key for the selected data element to be traced, then a link is determined between the selected data element and the application database. In various embodiments, the reconstructed hierarchical key in the code may need to match the hierarchical key for the selected data element fully, or may need to match at least partially.

In some embodiments, the automated system disclosed herein may not be able to fully reconstruct a hierarchical key for a particular data element. In this scenario, an estimate may be made for the missing key attribute with a corresponding confidence level for the estimate. If the confidence level is about a predetermined value, then the key may be used. If the confidence level is below a predetermined value, then the estimated key may not be used.

Thus, simply reviewing the source code alone does not yield all aspects of the hierarchical key that qualifies the data elements to aid in tracing them throughout various applications, systems, and technologies in the enterprise. The lineage gleaned in this manner establishes relationships based enterprise systems based on the true flow of data, and not based on element or field names. Similar mechanisms are applied across different technologies and frameworks.

A data flow loaded in the enterprise data warehouse (the metadata repository) consists essentially of a reference to a source and to a target data element. Both references are expressed by the unique hierarchical key values of the referenced data elements. The actual data flow described by a data flow object is always directed (from source to target data element), which means the reference of the source is well distinguished from the reference to the target data element. For efficiency in determining data flow paths across individual data flows, inverted references of the data flows (such as indexes) are also stored in the data warehouse to allow a fast and efficient identification of all data flows referencing a certain data element either as source or as target data element.

Figure 5:
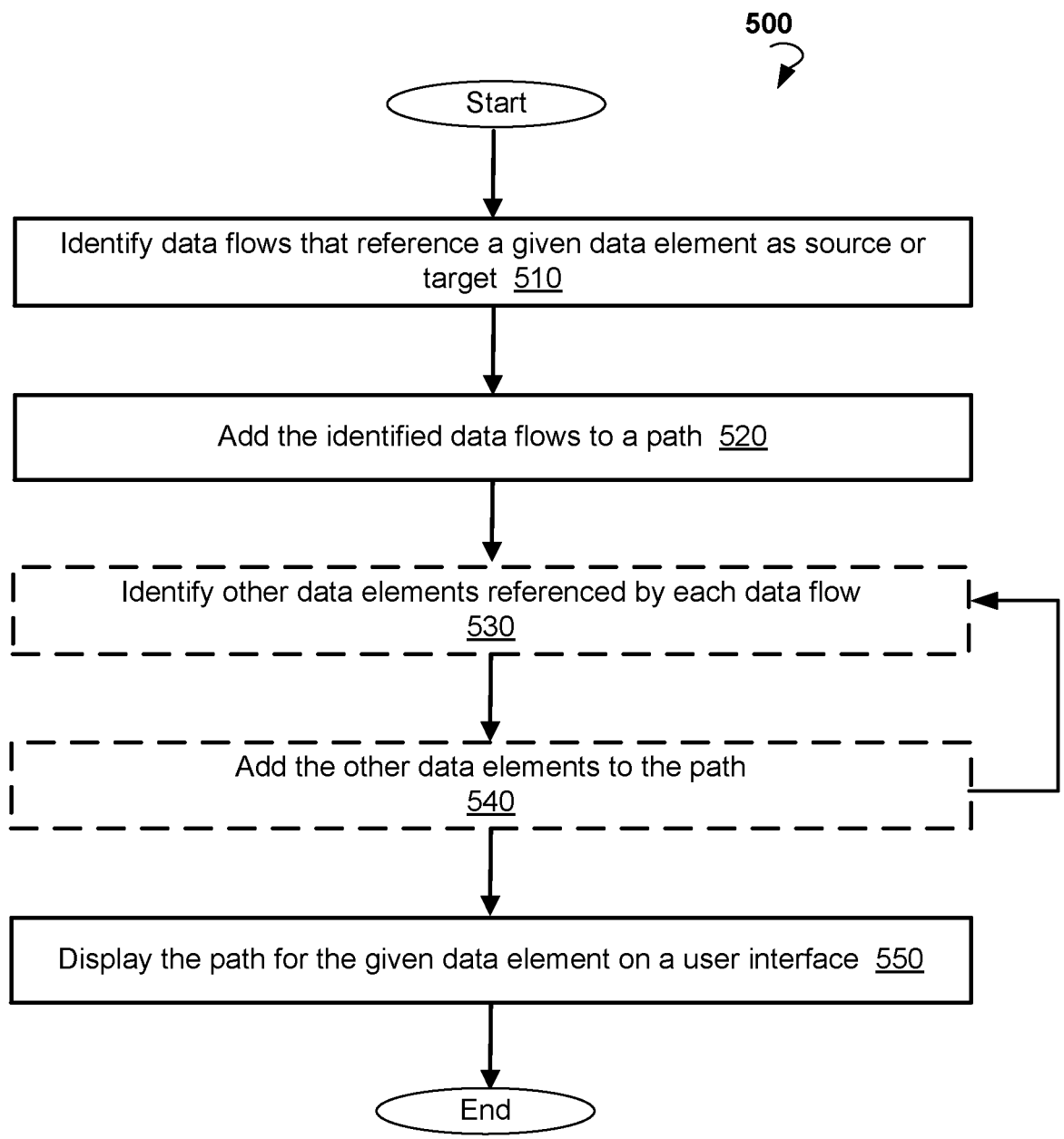
FIG. 5 illustrates an exemplary method for combining data flows into a data path.

A data flow typically has attributes describing the type of the data flow, the program's source code the data flow was derived from by parsing and further aspects commonly of interest. FIG. 5 represents an exemplary process flow chart 500 for summing data flows into a data path. In step 510, a path of data flows is determined for a given data element by identifying the data flows which reference the given data element in a given direction (i.e., either as source or as target). In step 520, the identified data flows are added to a path depicting the data flows. In step 530, "other" data elements referenced by the data flows to the path can be identified, where "other" means: any other data element referenced by the data flow that is not the starting data element. In step 540, these identified paths can be added to the flow as well. Steps 530 and 540 can be repeated iteratively for all data elements as given data elements until no further data elements can be found which are not yet contained in the path.

As an option, partial data flows may be determined by disregarding certain data elements or data flows either by their types, by the value of their attributes, by the value of their keys, or by another other metric or combination of metrics.

The path of data flows in the direction from target to source for a given start data element contains all the data elements forming the data lineage for the starting data element. Such derived paths of data flows are used to render data lineage in a user interface in step 550. The path of data flows in the direction from source to target contains, for a given start data element, all the data elements that have values depending on the starting data element. Paths of data flows are also used to render in a user interface where data in given data elements is used. It is also possible to find and to render the names of the programs which access and move the data between data elements around by retrieving the names of the programs from the involved data flow objects.
Exemplary Data Lineage Presentations on User Interface.

Figure 6:
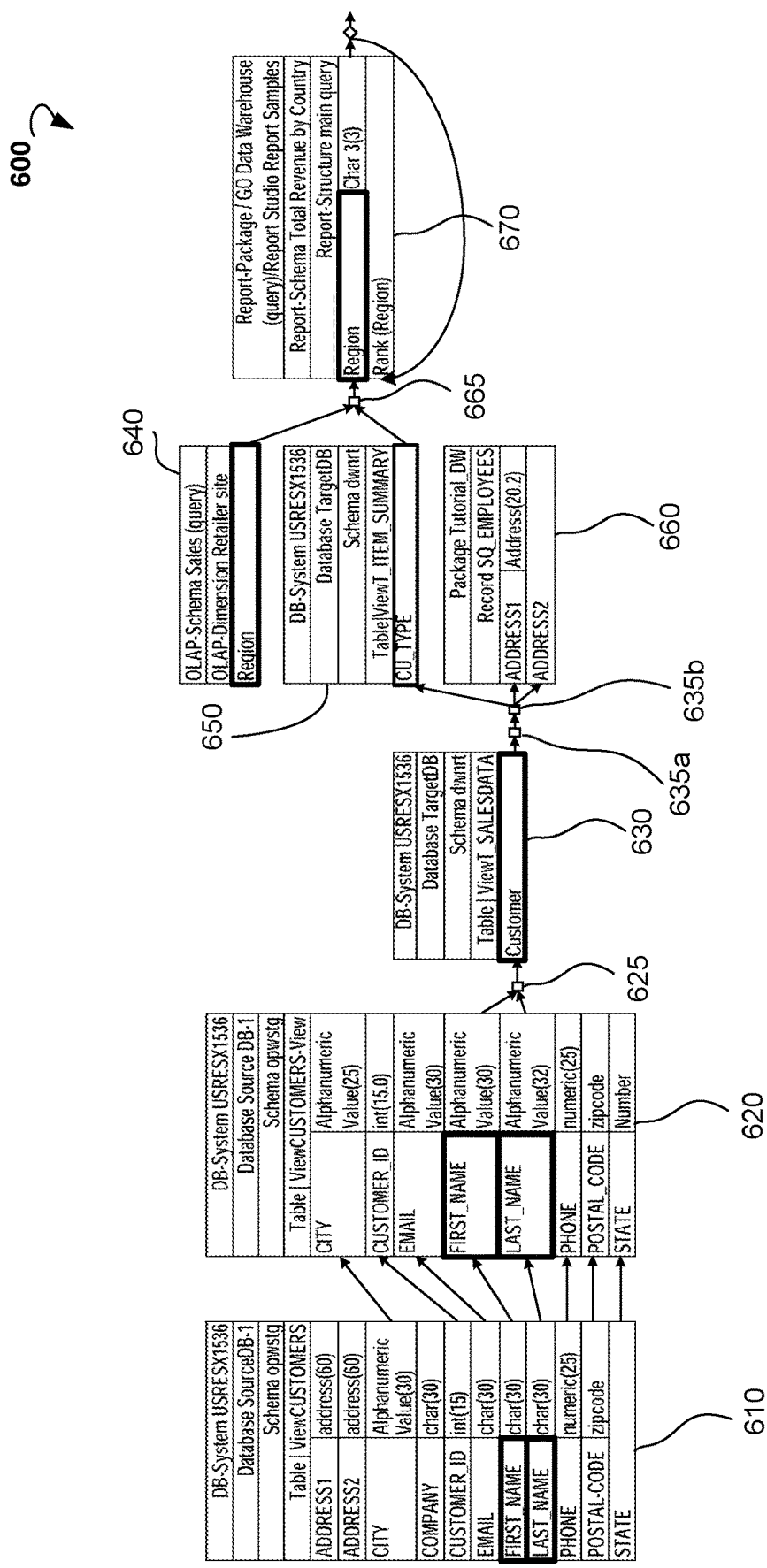
FIG. 6 is a screenshot illustrating exemplary steps of a code parsing "hop".

FIG. 6 is a screenshot 600 illustrating an exemplary data lineage and exemplary steps of a code parsing "hop." The system of the present technology can track a data element, regardless of the element name or how the data element is represented in the code. In some embodiments, the system can take a point-in-time snapshot of exactly where the data was sourced and distributed across the IT landscape, which is vital to many regulatory compliance initiatives. While only a few hops are depicted in the figure, there may actually be any number of hops in a lineage. An enterprise with multiple lines of business may typically have anywhere from four hops to thousands of hops from one end of the enterprise to the other end of the enterprise IT landscape. For example, an enterprise may have more than five-thousand hops from one end of the enterprise to the other end of the enterprise IT landscape in some embodiments.

In the exemplary lineage displayed in FIG. 6, table 610 is an Oracle database. The database system is USRESX1536, the database name is SourceDB-1, the database schema is opwstg, the particular table within the database is ViewCUSTOMERS, and the various fields in the table are depicted starting with ADDRESS1 to STATE. In an exemplary embodiment, a user of the metadata tracking system wishes to track a customer's name. In table 610, this is depicted by the boxes around the data field FIRST_NAME and the data field LAST_NAME.

The arrows from table 610 to table 620 in the data lineage depicted show that a number of the data fields from table 610 flow into table 620, which is another table titled ViewCUSTOMERS-View in the same database. In table 620, the field names remain the same (FIRST_NAME and LAST_NAME), but the property of the field has changed slightly. First example, field LAST_NAME in table 610 is a field up to 30 characters long, whereas field LAST_NAME in table 620 is an alphanumeric value up to 32 characters long. Thus, while the actual data in the field may not change from table 610 to table 620, the metadata (information about the data), has changed. Embodiments of the present disclosure track that metadata change.

In the data lineage presented in screenshot 600, operator 625 depicts that an operation was performed on the selected data fields (FIRST_NAME and/or LAST_NAME) and the data in the selected data fields is now captured in table 630 in the same database system, but in database TargetDB, with schema dwnrt, in table ViewT_SALESDATA as the field name Customer. Thus, the data from selected fields FIRST_NAME and LAST_NAME in table 620 has been aggregated into a singular field named Customer in table 630. While the data in the field may or may not have changed, the data fields have been aggregated and renamed in table 630, and thus the metadata associated with a customer's first name and last name has changed. The data lineage screenshot 600 depicts this metadata change.

Operators 635a and 635b depict that two additional transformations of the selected data fields have occurred, and the arrows show that the data has flowed into three separate places—table 640 which is a business application, table 650 which is an oracle database, and table 660 which is another application. In table 640, the customer name is represented in the data field Region. In table 650, the customer name is represented in the data field CU_TYPE.

Operator 665 depicts that another transformation has occurred to the data from table 640 and table 650, and the data is now represented in table 670 in the data field titled "Region". Table 670 is a table in a Business Object Application. Thus, the customer name can be traced from the final Business Object report, all the way back to its source in table 610. In this way, one can see how the data has flowed through the various software systems throughout the enterprise and how and where it has been transformed (aggregated, summed, concatenated, renamed, etc.) throughout the enterprise IT landscape to arrive from a source represented by table 610 to an end report represented by table 670. The selected data element is traced throughout the enterprise software systems, regardless of how it's named or represented in the software code. In sum, the lineage identifies all places where the selected data element has persisted—whether it's been stored, read, or written.

Further, the system provisions the necessary code into a repository and parses the code regardless of how many layers of programming, and/or various code frameworks are present (i.e., COBOL, Java, JSP (Java Server Pages), Hibernate, etc.). In this way, the system understands relationships of one or more code parsing "hop."

In performing the link between hops, the system may identify a targeted data element with a 5-part key consisting of application name or server name, database name, schema name, table name, and column name. This 5-part key creates a unique identifier for a data element, ensuring that the data element is unique across all technologies. In some embodiments, a data element with a 5-part key is matched to another 5-part key to create a lineage hop. Therefore, parsing source code language in this way results in a more accurate data element lineage. As would be understood by persons of ordinary skill in the art, although a 5-part key is disclosed here, other mechanisms of creating a unique identifier for a data element can also be used.

Figure 7:
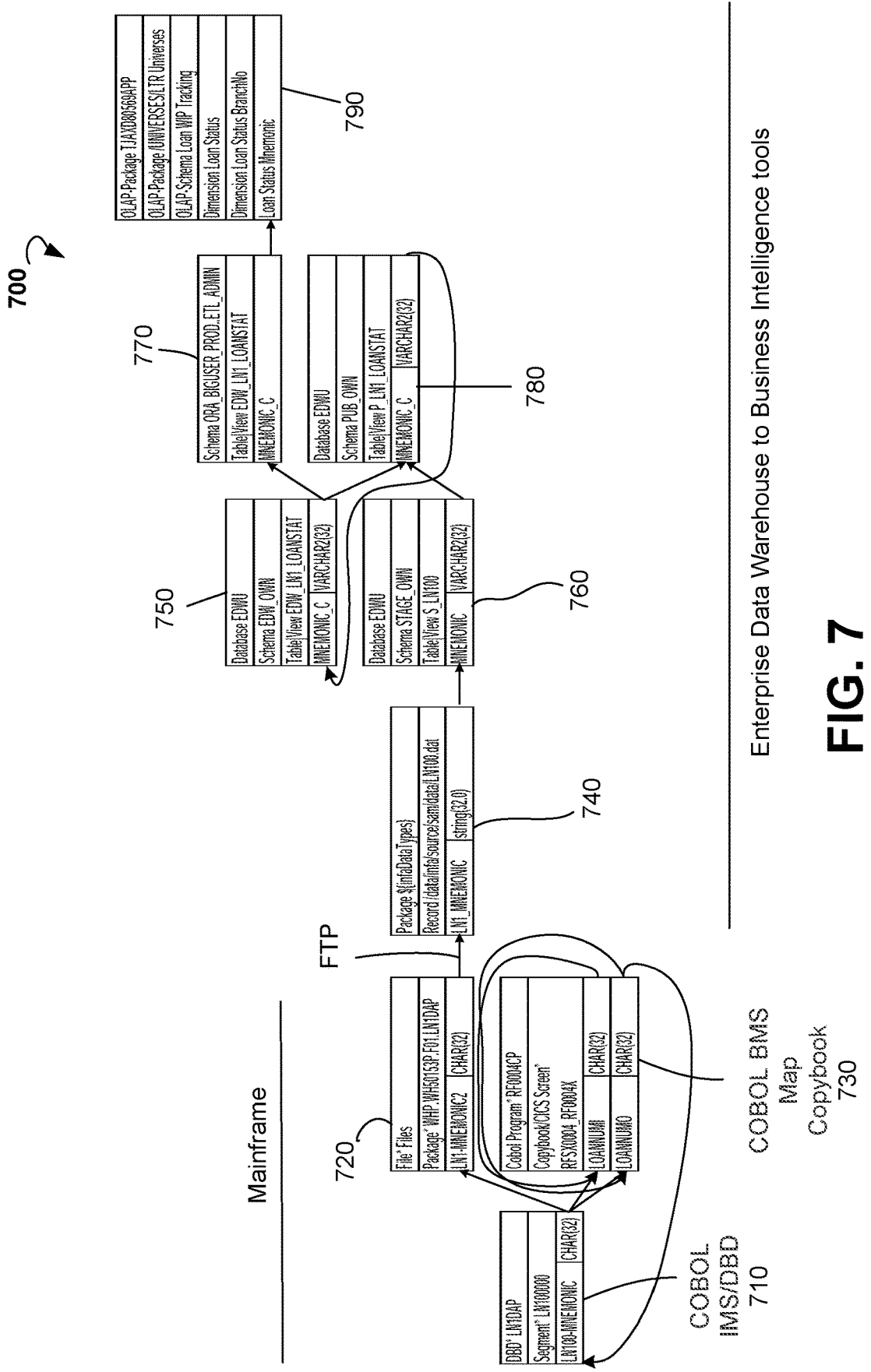
FIG. 7, FIG. 8, FIG. 9, and FIG. 10 are screenshots illustrating exemplary data lineage presentations accessible to a user.

FIG. 7 depicts another exemplary screenshot 700 of a data lineage presentation accessible to a user. The data flows are represented by the arrows from the mainframe, through the Enterprise Data Warehouse system, all the way to a final Business Intelligence tool. In this way, data lineage is calculated and depicted from end to end of an enterprise's entire IT landscape, across multiple environments, applications, technologies, etc.

In the exemplary screenshot 700, box 710 represents a database (COBOL IMS/DBD) in the mainframe. The data from box 710 flows to box 720 which is a file within the mainframe and to box 730 which is a program within the mainframe. As depicted in the figure, certain data from box 730 is returned to box 710.

From the mainframe, the data flows from box 720 via a file transfer protocol (FTP) to an application package in box 740. By this transfer, the data crosses from the mainframe to a distributed architecture. Box 740 can be any application package running on any platform, technology stack, or operating system. From there the data flows are represented by the arrows in the figure through various database tables (shown in boxes 750, 760, 770, and 780), and the data is ultimately captured in the "Loan Status Mneumonic" field in box 790 of a business intelligence tool.

Thus, a data field can be traced throughout an entire enterprise IT system from mainframe to business intelligence tool. Since an application may run on more than one server, the data can be present in multiple places; the lineage captures all places where the data has persisted in any platform or technology throughout the entire enterprise from end to end.

The lineage is traced from end to end through the use of the unique 5-part key identifier for the targeted data element, but also through the system's understanding of the enterprise's entire IT landscape. To trace data lineage, the system needs to understand how the various applications, databases, processes, files, and tools operate individually, as well as how they interact with one another. By understanding each platform and technology internally, as well as externally, a full data lineage can be calculated from one end to the other.

Furthermore, embodiments of the present disclosure rely on an understanding of various utilities (such as FTP) through source code and configuration files. By fully understanding configuration files, intelligence can be gleaned about the FTP utility, which in turn aids in the tracing of data elements through various parts of the IT landscape. For example, in order to understand the data hop from box 720 to box 740, there are potentially three or four different sources on the mainframe that need to be analyzed to determine how data is being manipulated, copied, or touched in any way throughout the mainframe. Evaluations need to be made on the job control language source, product source, control card, and/or the parallel control card. Once an understanding is made of the various sources themselves, then the source code is extracted, parsed, and understood. This in-depth analysis needs to occur simply to establish the one link between box 720 to box 740. Such analysis is repeated throughout the system to determine each link in the full lineage chain. In this way, data is captured, an understanding is applied to what has been captured, and then the data is reassembled based on the understanding gleaned about the underlying workings of the various IT packages operating in the enterprise landscape. Through this mechanism, embodiments of the present disclosure provide for a method to capture and translate every aspect of an enterprise IT landscape and trace any data element of interest throughout the entire enterprise.

Figure 8:
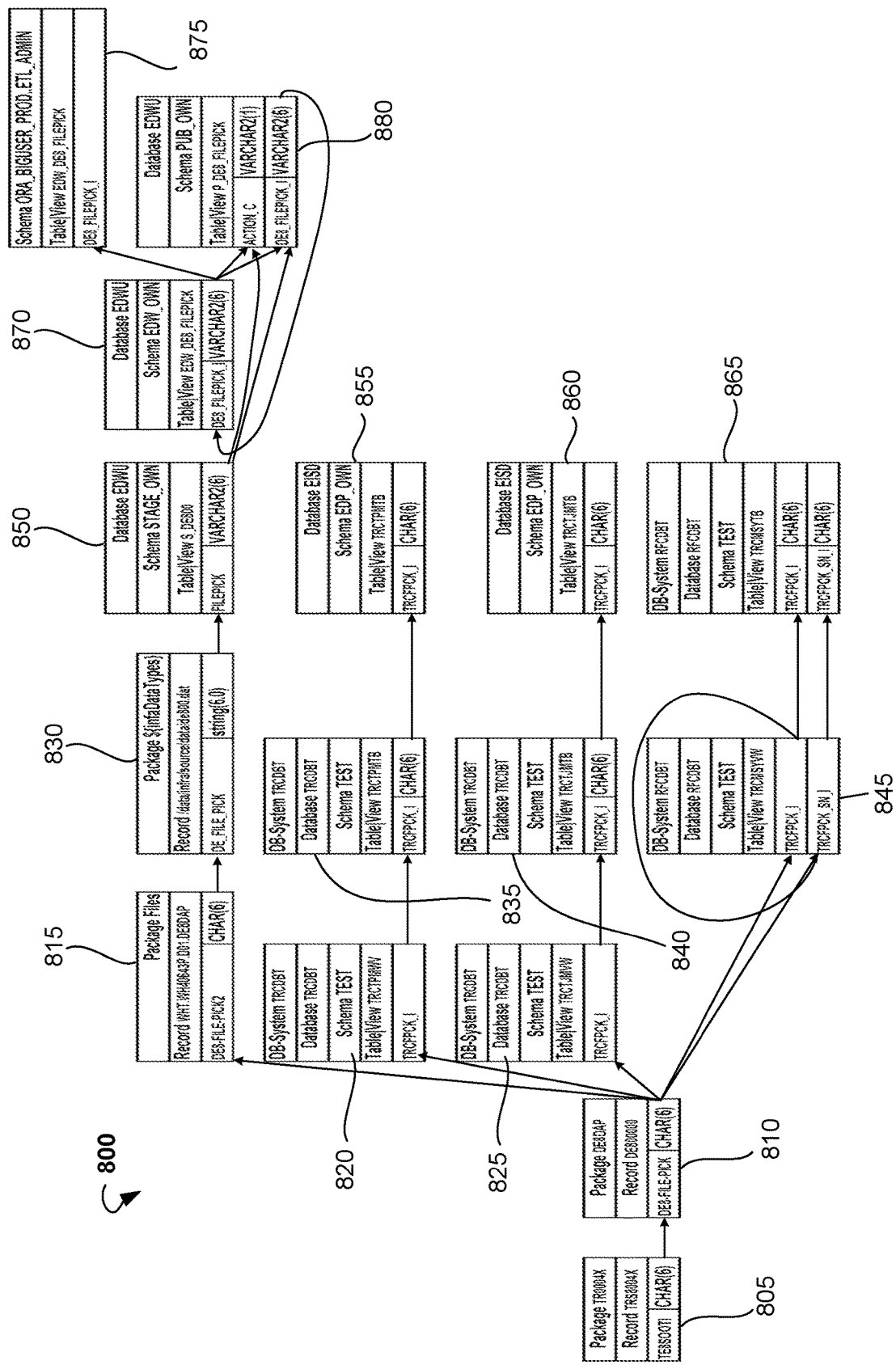

FIG. 8 depicts another exemplary screenshot 800 of a data lineage presented to a user. In the exemplary figure, mainframe COBOL code is parsed, and its data flow is connected to the relational database management system (RDBMS). Thus, connections are depicted from the code analysis lineage to the database system. Boxes 805, 810, 815, and 830 represent mainframe COBOL code. Boxes 820, 825, 835, 840, 845, 850, 855, 860, 865, 870, 875, and 880 represent the database system.

The arrows connecting the boxes track how the data element "TE85OOTI" from box 805 persists throughout the system. For example, from box 805 to box 810, the data element is referred to by a different name. Box 810 represents a different software package which uses the same data element, but with a different name (DE8-FILE-PICK). In box 815, the data is captured under yet a different element name (DE8-FILE-PICK2), and stored in databases shown in boxes 820 and 825 as yet another name (TRCFPCK_I). The screenshot 800 continues to show the flow of the data element to databases represented by boxes 875 and 880. In this way, all places where the data element "TE85OOTI" has persisted in the mainframe and corresponding database system is depicted here, along with its origination (where the data came from) and its destination (where the data is going). Since the field names may vary throughout the system, a simple character string match will not find all of the matches. However, through the use of the 5-part key and a deep understanding of the underlying mainframe and database system, each of these links can be determined to trace the flow of the data element of interest—"TE85OOTI" in this example.

Figure 9:
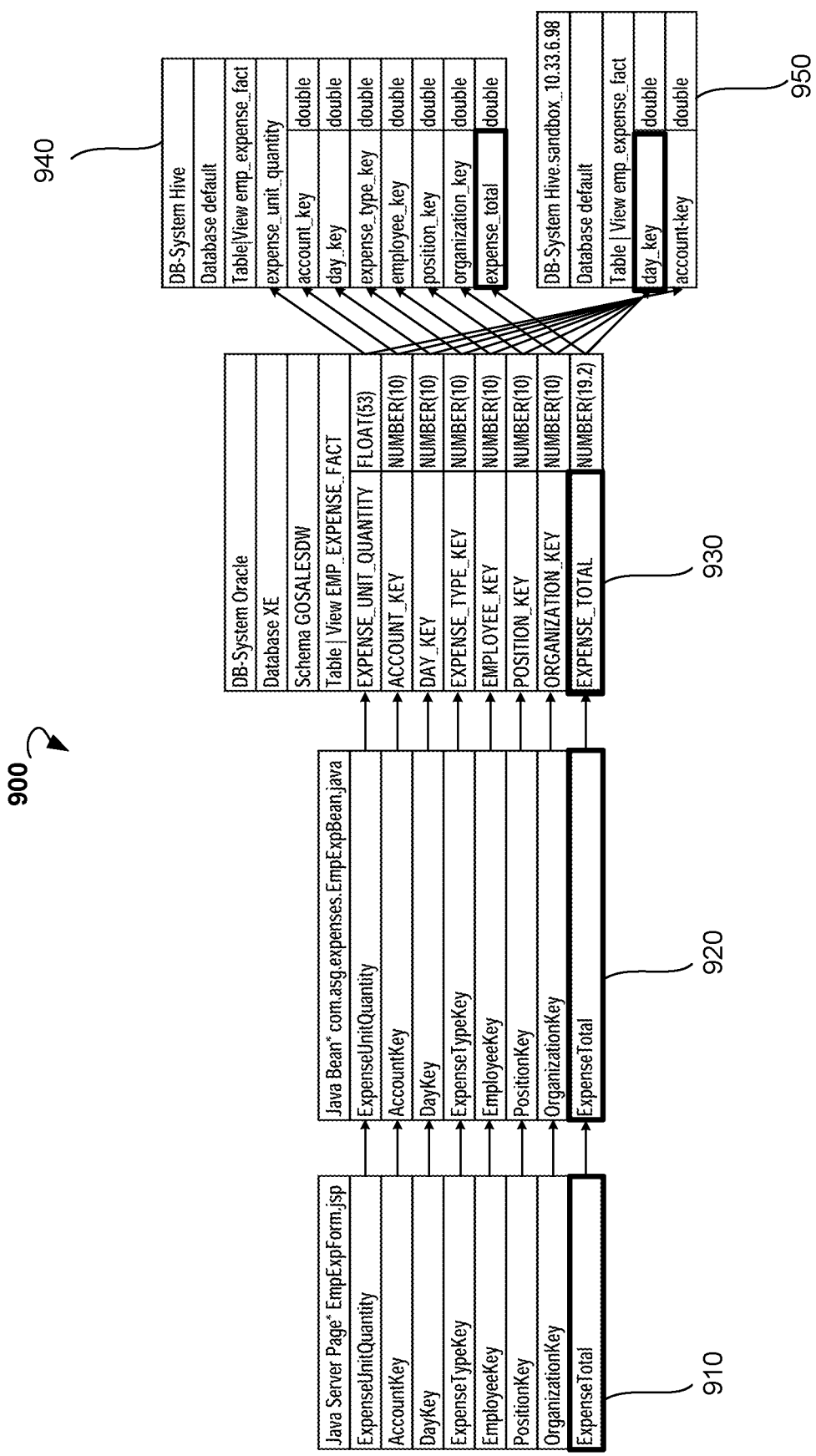

FIG. 9 depicts another exemplary screenshot 900 of a data lineage presented to a user. In the figure, box 910 represents a webpage as a Java Server Page. The selected data element "Expense Total" is traced to Java Bean in box 920. The Java Bean system is then tracked to an Oracle PLSQL (procedural SQL) table in box 930. From there, the data is tracked to boxes 940 and 950 which are part of a big data Hive data warehouse. Thus, in this example, by tracking the metadata, embodiments of the present disclosure allow for tracking of any particular data element across multiple platforms, such as from a web page to its placement in Hive. To determine each of the links and data flows presented in screenshot 900, the system parses the code and configuration files and utilizes those with a deep understanding of each technology platform to determine how to track a data element. The 5-part key is traced through each technology platform using the knowledge of each technology platform internally and its external interactions to determine each link for the data flow.

Figure 10:
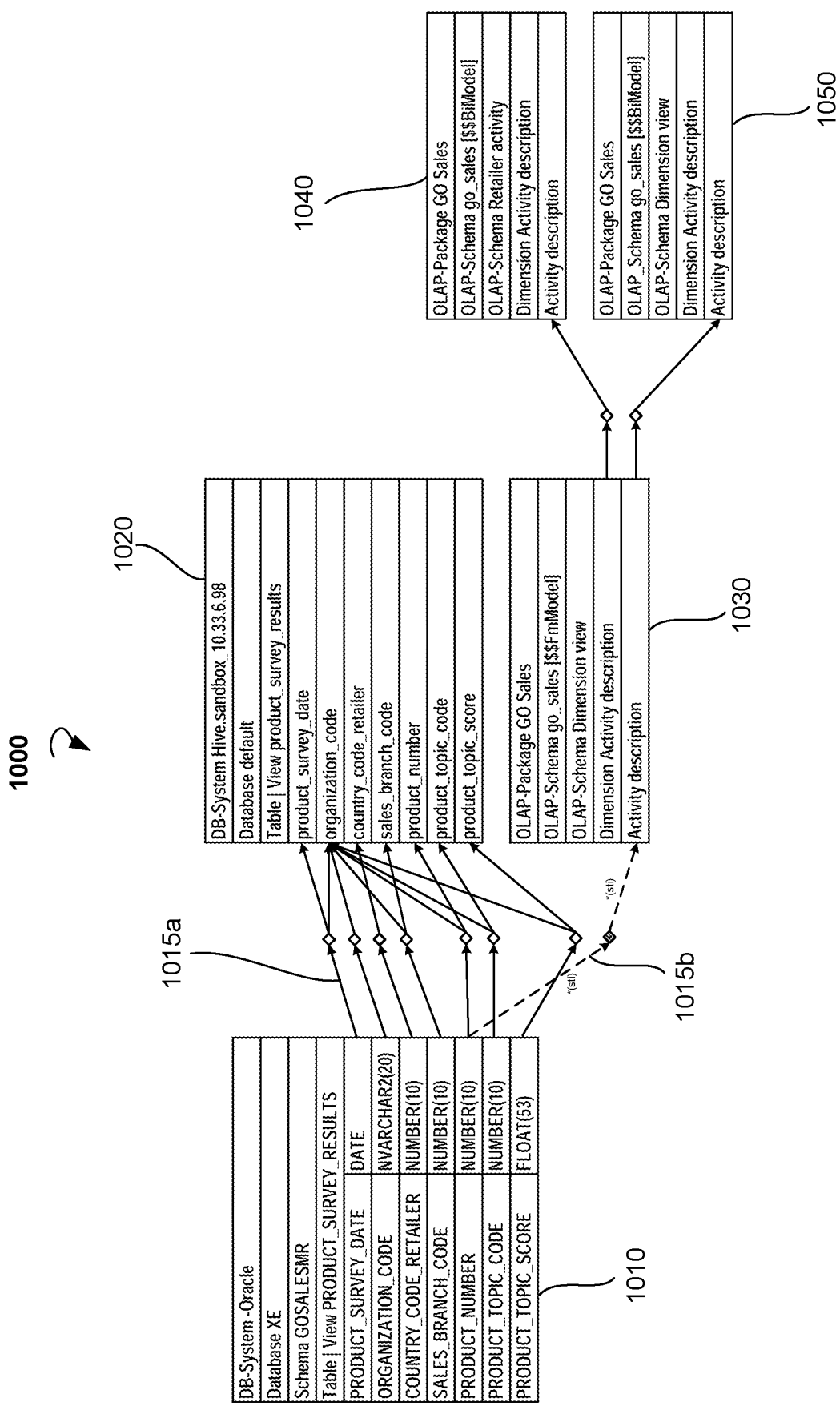

FIG. 10 depicts another exemplary screenshot 1000 of a data lineage presented to a user. In the figure, box 1010 represents a database table, box 1020 is a Hive database, and boxes 1030, 1040, and 1050 represent one or more business intelligence tools or applications. Link 1015a represents a link that was calculated via embodiments of the present disclosure. Link 1015a shows how data from the database table of box 1010 is transformed in some way and then reaches a Hive table represented by box 1020.

In various embodiments, a user may analyze the calculated results and discover that a link is missing. Because of the use of the 5-part unique identifier for each data element, it is highly unlikely that a false positive will result in an improper link being identified. However, for any number of reasons (such as insufficient understanding of the underlying system), the automatic calculation may fail to find a link that exists. In this event, a user can manually add the link and "stitch" the two components together based on stitching rules, for example, all columns prefixed or suffixed with specific letters or name based matches. This is represented in exemplary FIG. 10 via link 1015b. Because the link was manually added later, the data flow is represented as a dashed line instead of a solid link to visually show the difference.

As would be understood by a person of ordinary skill in the art, although data lineage is represented herein by boxes in a horizontal flow, the data lineage can actually be represented in any graphical manner. That is, other shapes besides boxes can be used; fewer or additional fields may be present in each box; vertical or diagonal representations may be used instead of horizontal flows; and other mechanisms besides arrows may be used to show links (sometimes referred to herein as hops).

In some embodiments, the system of the present technology can be used spanning mainframe and distributed environments and can interpret ETL hops back to the true source of record. For example, the system can parse mainframe COBOL and connect that data flow to a relational database management system (RDBMS), joining elements from the code analysis lineage to the database system. Additionally, the system can consolidate lineages crossing various technologies, data-stores, and platforms into a single repository supporting querying and visualization of end-to-end data lineage.

In further embodiments, the system can integrate with other applications allowing a user from a third party application to view data lineage without leaving the external application. For example, a REST (Representational State Transfer) API (application program interface) can be used to deliver data lineage to the third party application.

In some embodiments, the system of the present technology can build lineage from one particular line of business and extend to and across many lines of businesses creating a holistic Enterprise View of the lineage as it crosses business lines. Users of the system from one line of business can govern, update, and view their portion of the lineage.

In some embodiments the present technology includes tracking the data lineage over a time period. For example, tracking, by the processor, the data lineage over a time period. As described herein, the data lineage is calculated and depicted from end to end of an enterprise's entire IT landscape, across multiple environments, applications, technologies. Furthermore, determining an alteration of the data lineage for the selected data element, the alteration of the data lineage being a change in the at least one source-target pair over the time period; determining, by the processor, an alteration of the data lineage for the selected data element, the alteration of the data lineage being a change in the at least one source-target pair across the plurality of disparate software platforms in the enterprise software system over the time period; and providing, by the processor, an alert of the alteration of the data lineage for the selected data element, the alert being an indication of the change in the at least one source-target pair across the plurality of disparate software platforms in the enterprise software system over the time period.

In some embodiments tracking the data lineage over the time period comprises: receiving a first date and time input for the tracking of the data lineage over the time period; receiving a second date and time input for the tracking of the data lineage over the time period; and comparing the data lineage at the first date and time input with the data lineage at the second date and time input.

In various embodiments displaying the alteration of the data lineage for the selected data element on the graphical user interface accessible to the user, the alteration of the data lineage being the change in the at least one source-target pair over the time period comprising a change in the graphical data flow for the selected data element from each source-target pair across the plurality of disparate software platforms in the enterprise software system during the time period.

In some embodiments storing, using a database, the data lineage over the time period; and analyzing, by the processor, the data lineage over the time period, the analyzing the data lineage over the time period including a source location of each of the at least one source-target pair.

Various embodiments include providing a subscription service, the subscription service including the providing the alert of the alteration of the data lineage for the selected data element.

Some embodiments include the subscription service including the providing the alert of the alteration of the data lineage for the selected data element being pluggable into applications throughout the enterprise software system.

In some embodiments, the techniques described herein relate to a method, further including: formatting the data lineage for export; and exporting the data lineage for integration into other applications. For example, exporting the lineage results for integration in other applications may include exporting the data lineage in Comma-Separated Values (CSV) format or JavaScript Object Notation (JSON) format, or in image format. As disclosed herein the data lineage may be represented in any graphical manner in various embodiments.

In various embodiments The method of claim 1, wherein: the representation of source code comprises any Extract, Transform, Load (ETL) logic or Business Intelligence (BI) logic embedded in a tool. For example, the present technology allows semantic interpretation of any other ETL or BI logic embedded in tools using a visual designer and encoding data flow if any data form that may be extracted by export or an API. For example, the present technology is not limited to source code parsing but may capture and interpret other atomic building block conveying the same information in various embodiments.

Figure 11:
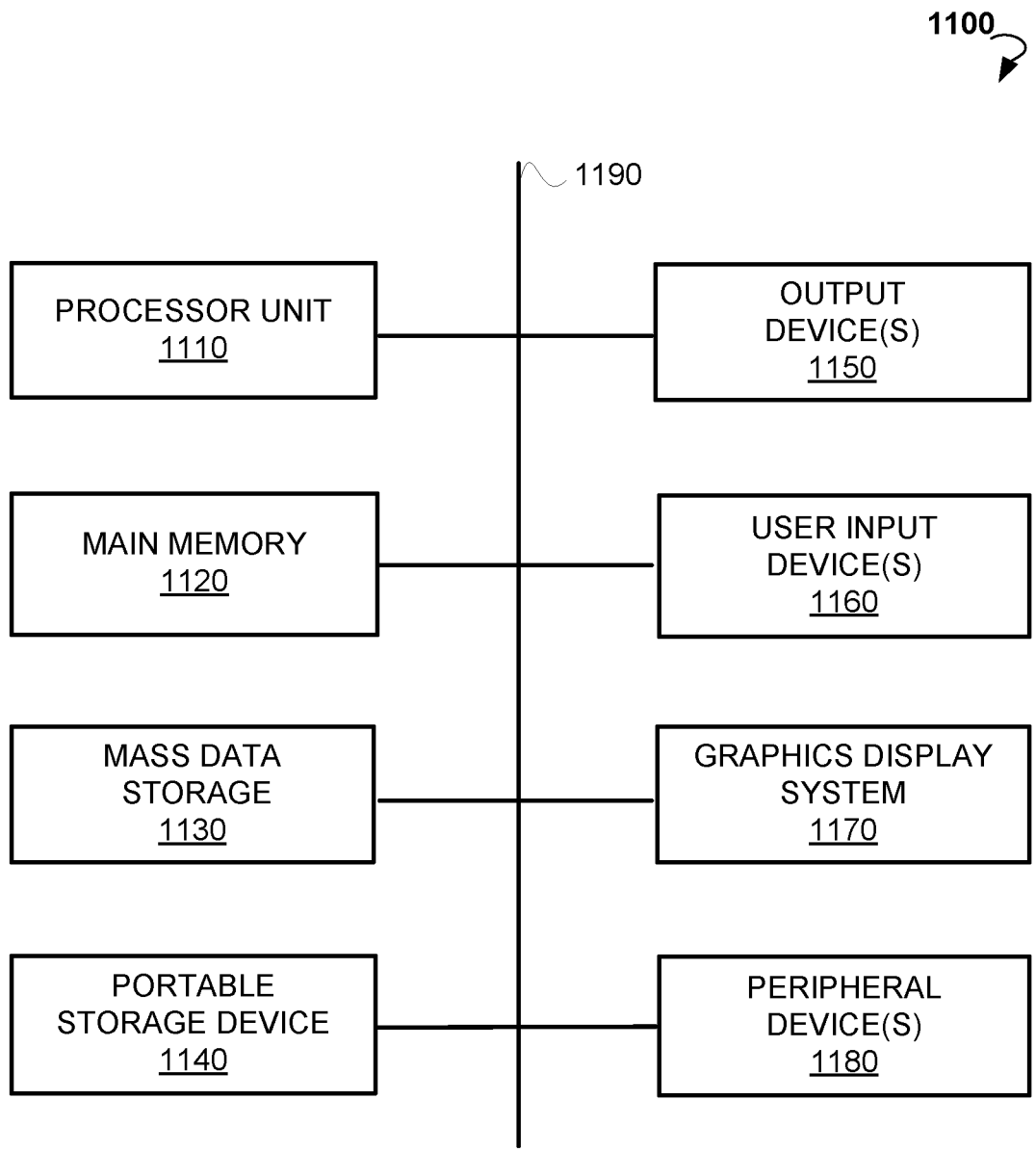
FIG. 11 is a diagrammatic representation of a computer system or a machine, within which a set of instructions for causing the machine to perform any one or more of the methodologies discussed herein, can be executed.

FIG. 11 illustrates an example computing system 1100 that may be used to implement embodiments of the present disclosure. The computing system 1100 of FIG. 11 may be implemented in the contexts of the likes of computing systems, networks, servers, or combinations thereof. For example, embodiments of the present technology are not limited to a mainframe computing environment and may be implemented using any enterprise software system including distributed applications, a cloud environment, a hybrid-cloud, and an on-premises environment. The computing system 1100 of FIG. 11 includes one or more processor units 1110 and main memory 1120. Main memory 1120 stores, in part, instructions and data for execution by processor unit 1110. Main memory 1120 may store the executable code when in operation.

The computing system 1100 of FIG. 11 further includes a mass data storage device 1130, portable storage device 1140, output device(s) 1150, user input device(s) 1160, a graphics display system 1170, and peripheral device(s) 1180.

The components shown in FIG. 11 are depicted as being connected via a single bus 1190. The components may be connected through one or more data transport means. Processor unit 1110 and main memory 1120 may be connected via a local microprocessor bus, and the mass data storage device 1130, peripheral device(s) 1180, portable storage device 1140, and graphics display system 1170 may be connected via one or more input/output (I/O) buses.

Mass data storage device 1130, which may be implemented with a magnetic disk drive or an optical disk drive, is a non-volatile storage device for storing data and instructions for use by processor unit 1110. Mass data storage device 1130 may store the system software for implementing embodiments of the present disclosure for purposes of loading that software into main memory 1120.

Portable storage device 1140 operates in conjunction with a portable nonvolatile storage medium, such as a floppy disk, compact disk, digital video disc, or Universal Serial Bus (USB) storage device, to input and output data and code to and from the computing system 1100 of FIG. 11. The system software for implementing embodiments of the present disclosure may be stored on such a portable medium and input to the computing system 1100 via the portable storage device 1140.

Input device(s) 1160 provide a portion of a user interface. Input device(s) 1160 may include one or more microphones, an alphanumeric keypad, such as a keyboard, for inputting alphanumeric and other information, or a pointing device, such as a mouse, a trackball, stylus, or cursor direction keys. Input device(s) 1160 may also include a touchscreen. Additionally, the computing system 1100 as shown in FIG. 11 includes output device(s) 1150. Suitable output devices include speakers, printers, network interfaces, and monitors.

Graphics display system 1170 may include a liquid crystal display (LCD) or other suitable display device. Graphics display system 1170 receives textual and graphical information and processes the information for output to the display device.

Peripheral device(s) 1180 may include any type of computer support device to add additional functionality to the computer system.

The components provided in the computing system 1100 of FIG. 11 are those typically found in computer systems that may be suitable for use with embodiments of the present disclosure and are intended to represent a broad category of such computer components that are well known in the art. Thus, the computing system 1100 of FIG. 11 may be a personal computer (PC), handheld computing system, telephone, mobile computing system, workstation, server, minicomputer, mainframe computer, or any other computing system. The computer may also include different bus configurations, networked platforms, multi-processor platforms, and the like. Various operating systems may be used including UNIX, LINUX, WINDOWS, MAC OS, ANDROID, CHROME, IOS, QNX, and other suitable operating systems.

It is noteworthy that any hardware platform suitable for performing the processing described herein is suitable for use with the embodiments provided herein. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a Compact Disk Read Only Memory (CD-ROM) disk, digital video disk (DVD), BLU-RAY DISC (BD), any other optical storage medium, Random-Access Memory (RAM), Programmable Read-Only Memory (PROM), Erasable Programmable Read-Only Memory (EPROM), Electronically Erasable Programmable Read Only Memory (EEPROM), flash memory, and/or any other memory chip, module, or cartridge.

In some embodiments, the computing system 1100 may be implemented as a cloud-based computing environment, such as a virtual machine operating within a computing cloud. In other embodiments, the computing system 1100 may itself include a cloud-based computing environment, where the functionalities of the computing system 1100 are executed in a distributed fashion. Thus, the computing system 1100, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

In some embodiments, the computing system 1100 may be on-premise computing systems.

Thus, systems and methods for managing intelligent metadata management and data lineage tracing have been disclosed. While various embodiments have been described above, it should be understood that they have been presented by way of example only, and not limitation. The descriptions are not intended to limit the scope of the technology to the particular forms set forth herein. It should be understood that the above description is illustrative and not restrictive. Thus, the breadth and scope of a preferred embodiment should not be limited by any of the above-described exemplary embodiments. To the contrary, the present descriptions are intended to cover such alternatives, modifications, and equivalents as may be included within the spirit and scope of the technology as appreciated by one of ordinary skill in the art.

What is claimed is:

1. A computer-implemented method for determining data lineage of a selected data element across an enterprise software system, the method comprising:
   receiving, at a processor, a selection of a data element for tracing across a plurality of disparate software platforms from one end of the enterprise software system to another end of the enterprise software system, the data element defined by a subsequently defined hierarchical key, and the data element stored in a repository;
   intelligently parsing, by the processor, a representation of source code to locate and understand computing instructions where the selected data element has been utilized;
   processing, by the processor, the computing instructions to determine how the selected data element is computed;
   determining, by the processor, at least one computing resource used in the computation of the selected data element;
   parsing, by the processor, the representation of source code to locate and understand computing instructions where each of the at least one computing resources used in the computation of the selected data element has been utilized;
   identifying a subset of the at least one computing resources that has been actually accessed while the source code is executing;
   reconstructing a hierarchical key for each computing resource in the subset;
   intelligently linking, by the processor, the selected data element to each computing resource in the subset as at least one source-target pair;
   combining, by the processor, each of the at least one source-target pair to compute a data lineage for the selected data element;
   displaying, by the processor, the data lineage on a graphical user interface accessible to a user, the data lineage comprising a graphical data flow for the selected data element from each source-target pair across the plurality of disparate software platforms in the enterprise software system;
   tracking, by the processor, the data lineage over a time period;
   determining, by the processor, an alteration of the data lineage for the selected data element, the alteration of the data lineage being a change in the at least one source-target pair across the plurality of disparate software platforms in the enterprise software system over the time period; and providing, by the processor, an alert of the alteration of the data lineage for the selected data element, the alert being an indication of the change in the at least one source-target pair across the plurality of disparate software platforms in the enterprise software system over the time period.

2. The method of claim 1, wherein the tracking the data lineage over the time period comprises:
receiving a first date and time input for the tracking of the data lineage over the time period;
receiving a second date and time input for the tracking of the data lineage over the time period; and
comparing the data lineage at the first date and time input with the data lineage at the second date and time input.

3. The method of claim 1, further comprising:
displaying the alteration of the data lineage for the selected data element on the graphical user interface accessible to the user, the alteration of the data lineage being the change in the at least one source-target pair over the time period comprising a change in the graphical data flow for the selected data element from each source-target pair across the plurality of disparate software platforms in the enterprise software system during the time period.

4. The method of claim 1, further comprising:
storing, using a database, the data lineage over the time period; and
analyzing, by the processor, the data lineage over the time period, the analyzing the data lineage over the time period including a source location of each of the at least one source-target pair.

5. The method of claim 1, further comprising:
providing a subscription service, the subscription service including the providing the alert of the alteration of the data lineage for the selected data element.

6. The method of claim 5, wherein the subscription service including the providing the alert of the alteration of the data lineage for the selected data element is pluggable into applications throughout the enterprise software system.

7. The method of claim 1, wherein the hierarchical key defining the selected data element is a 5-part hierarchical key.

8. The method of claim 7, wherein the 5-part hierarchical key comprises a server name, a database name, a database schema, a database table name, and a database column name.

9. The method of claim 1, further comprising reconstructing a hierarchical key for each of the at least one computing resources used in the computation of the selected data element.

10. The method of claim 1, wherein the linking the selected data element to the at least one computing resource further comprises matching the hierarchical key of the selected data element to a reconstructed hierarchical key of the computing resource.

11. The method of claim 1, wherein the data lineage for the selected data element is computed on a periodic schedule.

12. The method of claim 1, wherein the repository is a metadata repository.

13. The method of claim 1, wherein the parsing the representation of source code to locate and understand computing instructions where the selected data element has been utilized further comprises:

extracting source data elements and target data elements from at least one source application and target application;
loading source code into an enterprise data warehouse;
parsing the source code, the parsing comprising interpreting the source code for actions on data elements; and
generating a representation of the source code.

14. The method of claim 1, wherein the computing instructions comprise at least one of a write, read, or store instruction.

15. The method of claim 1, wherein the parsing the representation of source code to locate and understand computing instructions where each of the at least one computing resources used in the computation of the selected data element has been utilized further comprises parsing the representation of source code to locate assignments that write to each of the at least one computing resource used in the computation of the selected data element.

16. The method of claim 1, wherein the determining at least one computing resource used in the computation of the selected data element further comprises determining a memory location used in the computation of the selected data element and alternate names for the memory location used in the computation of the selected data element.

17. The method of claim 1, further comprising:
formatting the data lineage for export; and
exporting the data lineage for integration into other applications.

18. The method of claim 1, wherein: the representation of source code comprises any Extract, Transform, Load (ETL) logic or Business Intelligence (BI) logic embedded in a tool.

19. A non-transitory computer-readable medium for retroactively determining data lineage of a selected data element across an enterprise software system, the non-transitory computer-readable medium comprising instructions stored thereon, that when executed on a processor, perform the steps of:
receiving a selection of a data element for tracing across a plurality of disparate software platforms from one end of the enterprise software system to another end of the enterprise software system, the data element defined by a subsequently defined hierarchical key, and the data element stored in a repository;
intelligently parsing Business Intelligence (BI) logic comprising text to locate and understand computing instructions where the selected data element has been utilized, the intelligently parsing comprising analyzing the Business Intelligence (BI) logic to determine at least one verb that acts on the selected data element and a context in which the at least one verb is used;
processing the computing instructions to determine how the selected data element is computed;
determining at least one computing resource used in the computation of the selected data element;
parsing the Business Intelligence (BI) logic to locate and understand computing instructions where each of the at least one computing resources used in the computation of the selected data element has been utilized;
intelligently linking the selected data element to each of the at least one computing resources used in the computation of the selected data element as at least one source-target pair; combining each of the at least one source-target pair to compute a data lineage for the selected data element;
displaying the data lineage on a graphical user interface accessible to a user, the data lineage comprising a graphical data flow for the selected data element from each source-target pair across the plurality of disparate software platforms in the enterprise software system;

tracking the data lineage over a time period;

determining an alteration of the data lineage for the selected data element, the alteration of the data lineage being a change in the at least one source-target pair across the plurality of disparate software platforms in the enterprise software system over the time period; and providing an alert of the alteration of the data lineage for the selected data element, the alert being an indication of the change in the at least one source-target pair across the plurality of disparate software platforms in the enterprise software system over the time period.

20. A computer-implemented method for determining data lineage of a selected data element across an enterprise software system, the method comprising:

receiving, at a processor, a selection of a data element for tracing across a plurality of disparate software platforms from one end of the enterprise software system to another end of the enterprise software system, the data element defined by a subsequently defined hierarchical key, and the data element stored in a repository;

intelligently parsing, by the processor, Extract, Transform, Load (ETL) logic comprising text to locate and understand computing instructions where the selected data element has been utilized, the intelligently parsing comprising analyzing Extract, Transform, Load (ETL) logic to determine at least one verb that acts on the selected data element and a context in which the at least one verb is used;

processing, by the processor, the computing instructions to determine how the selected data element is computed;

determining, by the processor, at least one computing resource used in the computation of the selected data element;

parsing, by the processor, the Extract, Transform, Load (ETL) logic to locate and understand computing instructions where each of the at least one computing resources used in the computation of the selected data element has been utilized;

intelligently linking, by the processor, the selected data element to each of the at least one computing resources used in the computation of the selected data element as at least one source-target pair;

combining, by the processor, each of the at least one source-target pair to compute a data lineage for the selected data element;

displaying, by the processor, the data lineage on a graphical user interface accessible to a user, the data lineage comprising a graphical data flow for the selected data element from each source-target pair across the plurality of disparate software platforms in the enterprise software system;

tracking, by the processor, the data lineage over a time period;

determining, by the processor, an alteration of the data lineage for the selected data element, the alteration of the data lineage being a change in the at least one source-target pair across the plurality of disparate software platforms in the enterprise software system over the time period;

providing, by the processor, an alert of the alteration of the data lineage for the selected data element, the alert being an indication of the change in the at least one source-target pair across the plurality of disparate software platforms in the enterprise software system over the time period; and displaying the alteration of the data lineage for the selected data element on the graphical user interface accessible to the user, the alteration of the data lineage being the change in the at least one source-target pair over the time period comprising a change in the graphical data flow for the selected data element from each source-target pair across the plurality of disparate software platforms in the enterprise software system during the time period.

\* \* \* \* \*